US012789660B2

(12) United States Patent
Wang

(10) Patent No.: US 12,789,660 B2
(45) Date of Patent: Nov. 10, 2026

(54) ELECTRIC VEHICLE CHARGING CONTROL METHOD AND APPARATUS

(71) Applicant: Changchun Jetty Automotive Technology Co., Ltd., Changchun (CN)

(72) Inventor: Chao Wang, Changchun (CN)

(73) Assignee: CHANGCHUN JETTY AUTOMOTIVE TECHNOLOGY CO., LTD., Changchun (CN)

( * ) Notice: Subject to any disclaimer, the term of this patent is extended or adjusted under 35 U.S.C. 154(b) by 792 days.

(21) Appl. No.: 18/034,332

(22) PCT Filed: Jun. 25, 2021

(86) PCT No.: PCT/CN2021/102280

§ 371 (c)(1),
(2) Date: Apr. 27, 2023

(87) PCT Pub. No.: WO2022/095469

PCT Pub. Date: May 12, 2022

(65) Prior Publication Data

US 2023/0382254 A1 Nov. 30, 2023

(30) Foreign Application Priority Data

Nov. 6, 2020 (CN) ......................... 202011232789.5

(51) Int. Cl.
*B60L 53/60* (2019.01)
*B60L 53/16* (2019.01)
(Continued)

(52) U.S. Cl.
CPC ............... *B60L 53/60* (2019.02); *B60L 53/16* (2019.02); *H02J 7/80* (2026.01); *H02J 7/975* (2026.01); *B60L 2250/00* (2013.01)

(58) Field of Classification Search
CPC ...... B60L 53/60; B60L 53/16; B60L 2250/00; B60L 2240/36; B60L 2240/80;
(Continued)

(56) References Cited

U.S. PATENT DOCUMENTS 5,166,596 A * 11/1992 Goedken ................ H02J 7/977 320/160
6,624,615 B1 * 9/2003 Park ...................... B60L 3/0046 320/150
(Continued)

FOREIGN PATENT DOCUMENTS

CN 101277024 A 10/2008
CN 102651526 A 8/2012
(Continued)

OTHER PUBLICATIONS

CN110673667A Intelligent temperature control method and device for vehicle charging connection device (Machine Translation) (Year: 2020).*
(Continued)

*Primary Examiner* — M Baye Diao
(74) *Attorney, Agent, or Firm* — Hanley, Flight & Zimmerman, LLC

(57) ABSTRACT

An electric vehicle charging control method and apparatus related to the technical field of electric vehicle charging. The method includes: periodically obtaining a working temperature; maintaining a charging power output to an electric vehicle at a first charging power and triggering a first prompt signal, when the working temperature is greater than or equal to a first temperature threshold and less than a second temperature threshold; reducing the charging power output to the electric vehicle from the first charging power to a second charging power when the working temperature is greater than or equal to the second temperature threshold and less than a third temperature threshold; and stopping
(Continued)

charging the electric vehicle when the working temperature is greater than or equal to the third temperature threshold. Therefore, the charging efficiency can be improved and the charging time can be shortened on the premise of ensuring the charging safety of the electric vehicle.

19 Claims, 10 Drawing Sheets

(51) Int. Cl.
*H02J 7/80* (2026.01)
*H02J 7/90* (2026.01)

(58) Field of Classification Search
CPC .... B60L 2250/10; B60L 3/0084; B60L 53/62; B60L 53/14; B60L 53/68; H02J 7/80; H02J 7/975; H02J 2105/37; Y02T 10/70; Y02T 10/7072; Y02T 90/12; Y02T 90/14; G08B 21/18
USPC .......................................................... 320/109
See application file for complete search history.

(56) References Cited

U.S. PATENT DOCUMENTS

| | | | | |
|---|---|---|---|---|
| 8,729,856 | B2 * | 5/2014 | Nathan | H01R 11/00 439/503 |
| 9,056,553 | B2 * | 6/2015 | Cun | B60L 3/003 |
| 9,515,498 | B2 * | 12/2016 | Nishikawa | B60L 3/0023 |
| 2010/0109611 | A1 * | 5/2010 | Schaefer | H01M 10/48 320/134 |
| 2011/0016899 | A1 * | 1/2011 | Ogura | B60H 1/00278 62/239 |
| 2012/0212179 | A1 | 8/2012 | Nathan et al. | |
| 2015/0028809 | A1 * | 1/2015 | Nishikawa | B60L 3/0023 320/109 |
| 2015/0054462 | A1 | 2/2015 | Weidinger | |
| 2015/0120109 | A1 | 4/2015 | Cun | |
| 2016/0009191 | A1 | 1/2016 | Becker | |
| 2016/0339786 | A1 | 11/2016 | Dickinson et al. | |
| 2017/0334300 | A1 * | 11/2017 | Huang | B60L 53/16 |
| 2018/0354376 | A1 | 12/2018 | Jeon et al. | |
| 2023/0382254 | A1 | 11/2023 | Wang | |

FOREIGN PATENT DOCUMENTS

| | | | | | |
|---|---|---|---|---|---|
| CN | 105322628 | A | * | 2/2016 | |
| CN | 106299497 | A | | 1/2017 | |
| CN | 106505677 | A | | 3/2017 | |
| CN | 107478347 | A | * | 12/2017 | G01K 3/00 |
| CN | 105922880 | B | | 10/2018 | |
| CN | 109936185 | A | | 6/2019 | |
| CN | 209880993 | U | | 12/2019 | |
| CN | 110673667 | A | * | 1/2020 | G05D 23/20 |
| CN | 210191184 | U | | 3/2020 | |
| CN | 112389220 | A | | 2/2021 | |
| CN | 212447189 | U | | 2/2021 | |
| EP | 4242042 | A1 | | 9/2023 | |
| JP | 2013198372 | A | | 9/2013 | |
| JP | 2015089337 | A | | 5/2015 | |
| JP | 5796717 | B2 | * | 10/2015 | Y02T 10/70 |
| JP | 5867587 | A | | 1/2016 | |
| JP | 2017032311 | A | | 2/2017 | |
| JP | 2017073845 | A | | 4/2017 | |
| JP | 2020120560 | A | | 8/2020 | |
| JP | 7549144 | B2 | | 9/2024 | |
| WO | 2011120793 | A1 | | 10/2011 | |
| WO | 2013132874 | A1 | | 9/2013 | |
| WO | 2022095469 | A1 | | 5/2022 | |

OTHER PUBLICATIONS

European Patent Office, "Extended European Search Report," issued in connection with European Patent Application No. 21888172.0, dated Apr. 11, 2024, 14 pages.
Japanese Patent Office, "Notice of Reasons for Refusal," issued in connection with Japanese Patent Application No. 2023-524941, dated Apr. 8, 2024, 8 pages. [English language machine translation included.].
Korean Patent Office, "First Office Action," issued in connection with Korean Patent Application No. 10-2023-7012673, dated Jul. 8, 2024, 24 pages. [English translation provided].
Canadian Intellectual Property Office, "First Office Action," issued in connection with Canadian Patent Application No. 3,196,659, dated Sep. 19, 2024, 9 pages.
International Searching Authority, "International Search Report," in connection with International Patent Application No. PCT/CN2021/102280, issued Sep. 27, 2021, 2 pages.
China National Intellectual Property Administration, "First Notification of Office Action," in connection with Chinese Patent Application No. 202011232789.5, issued Oct. 26, 2021, 10 pages. English translation provided.
China National Intellectual Property Administration, "Search Report," in connection with Chinese Patent Application No. 202011232789.5, issued Oct. 26, 2021, 5 pages. English translation provided.
Brazilian Patent Office, "Office Action and Search Report" issued on May 20, 2025, for counterpart BR Patent Application No. BR1120230080681, 8 pages (English Translation Included).
Mexican Patent Office, "First Office Action," issued in connection with Mexican Patent Application No. MX/a/2023/005159, dated May 18, 2023, 6 pages.
Canadian Intellectual Property Office, "Second Office Action and Search Report," issued connection with Canadian Patent Application No. 3,196,659, issued on Aug. 22, 2025, 3 pages.
Mexican Patent Office, "Second Office Action," issued in connection with Mexican Patent Application No. MX/a/2023/005159, issued on Oct. 1, 2025, 6 pages. [with English Translation].
European Patent Office, "Intention to Grant", issued in connection with EP Patent Application No. 21 888 172.0 on Feb. 20, 2025, 5 pages.
Indian Patent Office, "Examination Report", issued in connection with IN Patent Application No. 202327038147 on Feb. 24, 2025, 6 pages.
Korean Patent Office, "Office Action", issued in connection with KR Patent Application No. 2023-7012673 on Mar. 11, 2025, 7 pages.
Vietnam Patent Office, "Office Action", issued in connection with VN Patent Application No. 2023-03280 on Mar. 31, 2025, 2 pages.
International Searching Authority, "Written Opinion," issued in connection with PCT/CN2021/102280, mailed on Sep. 27, 2021, 9 pages. [English translation included].
The State Intellectual Property Office of People's Repulic of China, "Notification to Grant," issued in connection with Chinese Patent Application No. 202011232789.5, dated Apr. 28, 2022, 3 pages. [English translation included].
International Bureau, "International Preliminary Report on Patentability," issued in connection with PCT/CN2021/102280, issued May 8, 2023, 11 pages. [English translation included].
Intellectual Property Corporation of Malaysia, "Substantive Examination Adverse Report (Section 30(1))," issued in connection with Malaysian Patent Application No. PI2023002039, dated Jan. 12, 2026, 5 pages.

* cited by examiner

ELECTRIC VEHICLE CHARGING CONTROL METHOD AND APPARATUS

CROSS REFERENCE TO RELATED APPLICATION

The present disclosure is a US National Stage of International Application No. PCT/CN2021/102280, filed Jun. 25, 2021, which claims priority to Chinese Patent Application No. 202011232789.5, filed on Nov. 6, 2020, entitled 'electric vehicle charging control method and apparatus' and, which are hereby incorporated by reference in their entireties.

TECHNICAL FIELD

The present disclosure relates to a technical field of electric vehicle charging, and particularly to an electric vehicle charging control method and apparatus.

BACKGROUND

In recent years, the electric vehicles have been developed rapidly all over the world, and the numbers of the electric vehicles and the charging piles rise continuously. The users hope to charge the vehicle battery as soon as possible. In the prior art, high-power modes such as large current and high voltage are usually adopted to meet the users' needs for charging the vehicle battery. However, the temperature of the vehicle battery increases with time during charging, and continually charging the vehicle battery in the high-power mode may lead to various charging safety accidents, so the charging safety and reliability have become a very important problem urgently to be solved.

In the prior art, most of the charging piles will continue to charge the vehicle battery by reducing the charging power after the working temperature increases. However, this way simply reduces the output charging power, which will lead to a great difference between the actual output power of the charging pile and the required power of the vehicle. This situation undoubtedly prolongs the charging time of the vehicle battery, and also increases the uncontrollability and the charging risk during the charging process of the vehicle battery.

How to reduce the extension of the charging time caused by the increase of temperature during the charging of the vehicle battery while ensuring the safety is a problem urgently to be solved in the prior art.

SUMMARY

In order to solve the technical problem in the prior art, the embodiments of the present disclosure provide an electric vehicle charging control method and apparatus, which solve the problem in the prior art that the charging speed is slow and the charging efficiency is low due to the temperature change.

The present disclosure provides an electric vehicle charging control method, including:

periodically obtaining a working temperature;

maintaining a charging power output to an electric vehicle at a first charging power and triggering a first prompt signal, when the working temperature is greater than or equal to a first temperature threshold and less than a second temperature threshold; and reducing the charging power output to the electric vehicle form the first charging power to a second charging power, when the working temperature is greater than or equal to the second temperature threshold and less than a third temperature threshold.

The present disclosure further provides an electric vehicle charging control apparatus, including:

a temperature detection unit configured to periodically obtain a working temperature; and a charging control unit configured to maintain a charging power output to an electric vehicle at a first charging power and trigger a first prompt signal, when the working temperature is greater than or equal to a first temperature threshold and less than a second temperature threshold; and reduce the charging power output to the electric vehicle from the first charging power to a second charging power, when the working temperature is greater than or equal to the second temperature threshold and less than a third temperature threshold.

The embodiments of the present disclosure further provide a computer device, comprising a memory, a processor and a computer program stored in the memory and executable on the processor, wherein the processor is configured to execute the computer program to implement the aforementioned method.

The embodiments of the present disclosure further provide a computer nonvolatile readable storage medium storing a computer instruction, wherein when being executed by a processor, the computer instruction implements the aforementioned method.

By using the embodiments of the present disclosure, the charging efficiency can be improved and the charging time can be shortened on the premise of ensuring the charging safety of the electric vehicle. Of course, the implementation of any of the products and/or methods of the present disclosure does not need to achieve all of the advantages mentioned above.

BRIEF DESCRIPTION OF THE DRAWINGS

For a clearer illustration of technical features in the embodiments of the present disclosure or the prior art, a brief description of the drawings for the embodiments or the prior art will be given below. Obviously, the drawings described below involve only some embodiments of this disclosure. For those of ordinary skill in the art, other drawings can be derived from these drawings without any inventive efforts.

REFERENCE SIGNS

100: electric vehicle; 101: vehicle connector; 102: charging control box; 103: charging control unit; 104: temperature detection unit; 105: power connector; 106: charging power supply; 301: temperature detection unit; 302: charging control unit; 303: memory; 304: prompting unit; 305: communication unit; 501: temperature detection unit; 502: comparison unit; 503: charging control unit; 504: driving unit; 505: switch unit; 506: compensation unit; 600: charging control apparatus; 601: temperature detection unit; 602: comparison unit; 603: charging control unit; 604: driving unit; 605: switch unit; 606: compensation unit; 607: power regulation unit; 608: feedback unit; R1, R2, R3, R4, R5, R6, R7, R8: resistor; RT1: thermistor; U1: operational amplifier; D1, D2: diode; Q1, Q2, Q3: triode; K1: switch; VCC: power supply; $V_{REF}$: reference voltage; $V_t$: temperature voltage; $V_{out}$: output end.

DETAILED DESCRIPTION

A clear and complete description of the embodiments of the present disclosure will be set forth with reference to the drawings. Obviously, the described embodiments are only a part, rather than all, of the embodiments of the present disclosure. All other embodiments derived by persons skilled in the art from the embodiments of the present disclosure without making inventive efforts shall fall within the scope of the present disclosure.

Figure 1A:
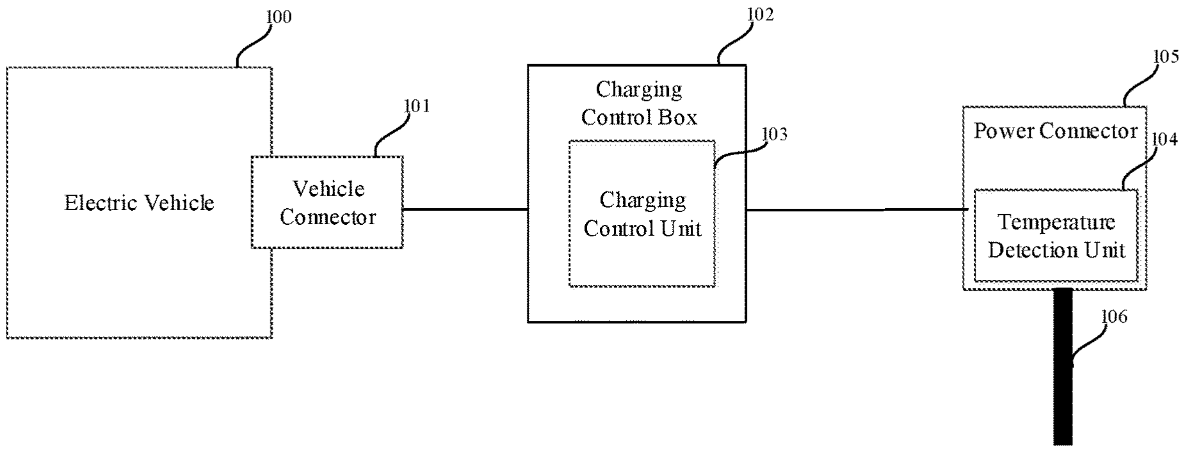
FIGS. 1*a* to 1*c* illustrate schematic structural diagrams of a charging control system of an electric vehicle according to an embodiment of the present disclosure.
Figure 1B:
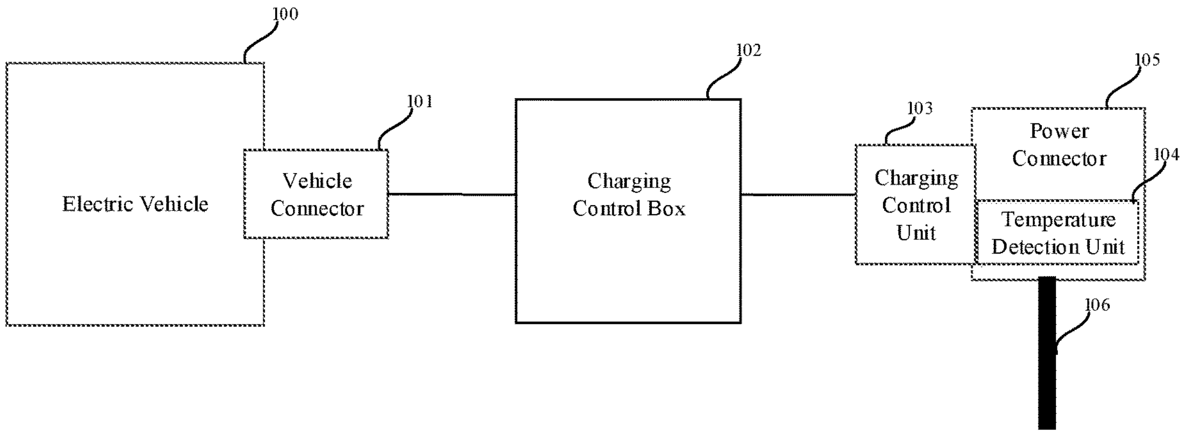
Figure 1C:
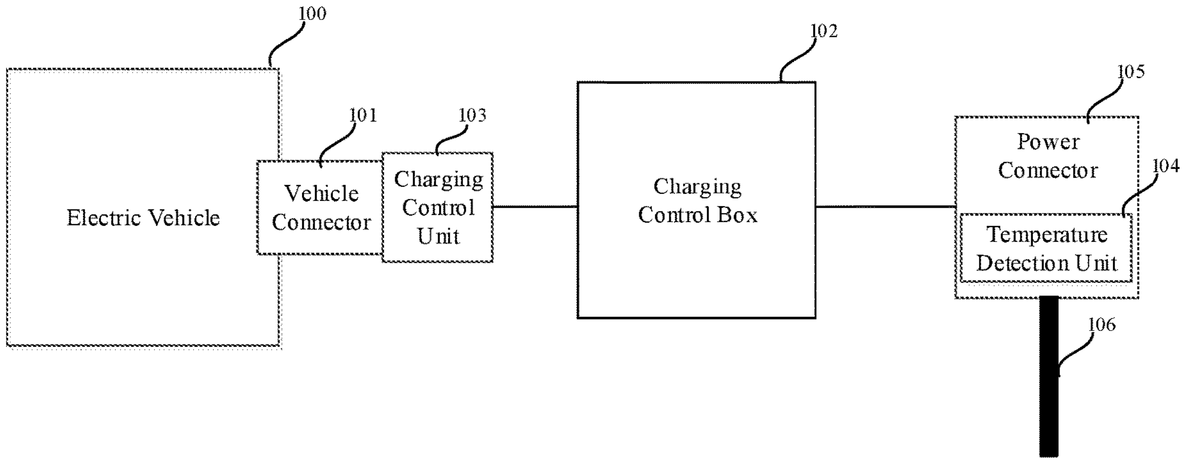

FIGS. 1*a* to 1*c* illustrate schematic structural diagrams of a charging control system for an electric vehicle according to an embodiment of the present disclosure. An electric vehicle 100 is connected to a charging power supply 106 through a vehicle connector 101, a charging control box 102, a charging control unit 103, a temperature detection unit 104 and a power connector 105. The charging power supply 106 outputs charging current required for charging the electric vehicle 100 to the electric vehicle 100. The charging control unit 103 controls output power of the charging current according to a working temperature collected by the temperature detection unit 104, so that a high-speed charging of the electric vehicle 100 can be maintained when the working temperature increases, thereby shortening the charging time and improving the charging efficiency. The temperature detection unit 104 may be integrated into the power connector 105, so that a change of the working temperature in the charging process of the electric vehicle can be obtained more quickly. The working temperature refers to a temperature of a charging component other than the battery in the electric vehicle, such as a temperature of an electrode of the power connector 105, a temperature of a cable, and a temperature of a component in the charging control box 102. The charging control box includes a charging pile, an in-cable control box, etc.

The charging control unit 103 may be disposed in the charging control box 102 as illustrated in FIG. 1*a*, or in the power connector 105 as illustrated in FIG. 1B, or in the vehicle connector 101 as illustrated in FIG. 1*c*. The temperature detection unit 104 is built in the power connector 105, and may be a temperature-sensitive resistor or the like to collect the temperature of the electrode of the power connector 105. The charging control unit 103 is configured to control the power of the charging current (including regulating the charging current or voltage) output to the electric vehicle 100, so as to decrease the temperature in the power connector 105 by reducing the output charging power.

Figure 2:
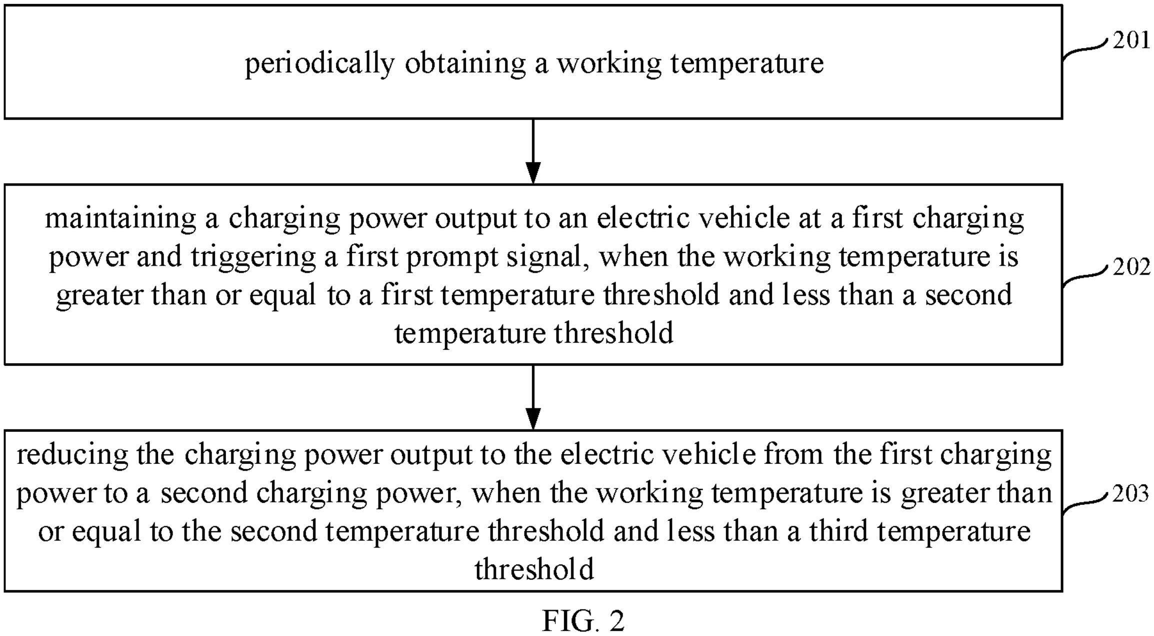
FIG. 2 illustrates a flowchart of an electric vehicle charging control method according to an embodiment of the present disclosure.

FIG. 2 illustrates a flowchart of an electric vehicle charging control method f according to an embodiment of the present disclosure. FIG. 2 depicts a method for regulating power of output charging current according to a working temperature. For example, the power of the charging current output to the electric vehicle is controlled according to the temperature collected in the power connector 105, so as to decrease the temperature in the power connector 105 while maintaining efficient charging of the electric vehicle in a safe charging manner. The charging control method is performed by the charging control unit 103, and specifically, according to the working temperature obtained by the temperature detection unit 104, a duty ratio of the output charging current may be regulated by means of pulse width modulation (PWM), etc., so as to regulate the charging current and voltage. The charging control method specifically includes:

step 201: periodically obtaining a working temperature;

step 202: maintaining a charging power output to an electric vehicle at a first charging power and triggering a first prompt signal, when the working temperature is greater than or equal to a first temperature threshold and less than a second temperature threshold;

step 203: reducing the charging power output to the electric vehicle from the first charging power to a second charging power, when the working temperature is greater than or equal to the second temperature threshold and less than a third temperature threshold.

In an embodiment of the present disclosure, the method further includes stopping charging the electric vehicle when the working temperature is greater than or equal to the third temperature threshold.

In an embodiment of the present disclosure, periodically obtaining the working temperature further includes: obtaining a working temperature of a power connector according to specified time.

In this step, the temperature detection unit is built in the power connector, and the temperature detection unit is spaced from a live wire terminal and/or a neutral wire terminal in the power connector and connected thereto by means of insulation and heat-conduction, such as by means of insulating heat-conductive adhesive, so that it is possible to transfer the temperature of the live wire terminal in the power connector to the temperature detection unit, and avoid the accident that the charging control unit is burned by the high-voltage charging current due to the temperature-sensitive resistor used as the temperature detection unit. The specified time refers to the time set by the user. For example, the working temperature of the power connector is collected two minutes later when the electric vehicle starts to be charged, and then collected at an interval of two minutes or 30 seconds (or any other time interval). Alternatively, the working temperature of the power connector may be collected at a variable time interval, and for example, when the working temperature exceeds the second temperature threshold, the collection time interval is shortened, and when the working temperature begins to decrease after exceeding the second temperature threshold, the collection time interval is increased.

In an embodiment of the present disclosure, periodically obtaining the working temperature further includes: setting a time interval for acquiring the working temperature according to a change trend of the working temperature.

In this step, when the working temperature is in an ascending trend, the time interval for obtaining the working temperature is shortened; and when the working temperature is in a descending trend, the time interval for obtaining the working temperature is increased.

For example, when the working temperature is in the ascending trend, the time interval for obtaining the working temperature is shortened to ½ of the previous time interval, and when the working temperature exceeds the second temperature threshold, the time interval for obtaining the working temperature is further shortened, e.g., to ½ of the latest time interval. When the working temperature is in the descending trend, the time interval for obtaining the working temperature is increased to twice of the previous time interval, and particularly when the working temperature exceeds the second temperature threshold and is in a range between the second temperature threshold and the first temperature threshold, the time interval for obtaining the working temperature may be further increased, e.g., to twice of the latest time interval. When the working temperature is in the descending trend and close to or lower than the first temperature threshold, the time interval for obtaining the working temperature is increased.

In an embodiment of the present disclosure, periodically obtaining the working temperature further includes: setting a time interval for obtaining the working temperature according to a climate condition.

In this step, when the climate condition is summer and the outdoor temperature is high, the time interval for obtaining the working temperature is shortened, and particularly when the working temperature is higher than the second temperature threshold, the time interval for obtaining the working temperature may be further shortened, e.g., to ½ of the latest time interval. When the climate condition is winter and the outdoor temperature is low, the time interval for obtaining the working temperature is increased, and particularly when the working temperature is lower than the second temperature threshold, the time interval for obtaining the working temperature may be further increased, e.g., to twice of the latest time interval.

In an embodiment of the present disclosure, maintaining the charging power output to the electric vehicle and triggering the first prompt signal, when the working temperature is greater than or equal to the first temperature threshold and less than the second temperature threshold further includes:

prompting a user of a state of the current working temperature through the first prompt signal by means of at least one selected from the group of sound, light, and vibration.

In this step, it is also possible to prompt the user by means of vibration or display on a display screen, or by sending prompt information to an intelligent terminal of the user (e.g., an intelligent device such as a mobile phone) through an APP (application software). Therefore, the user can be prompted to notice whether a charging element of the electric vehicle is existed near a heat source or in other cases, and the user can manually release the heat source. The state of the working temperature refers to a temperature range of the current working temperature. For example, it is a normal charging state when the current working temperature is between the first temperature threshold and the second temperature threshold; it is a charging state with a high dangerous temperature when the current working temperature is between the second temperature threshold and the third temperature threshold; it is a normal charging state when the current working temperature is lower than the first temperature threshold; and it is a charging state in which the temperature exceeds a safety requirement when the current working temperature reaches the third temperature threshold.

In an embodiment of the present disclosure, after reducing the charging power output to the electric vehicle from the first charging power to the second charging power, when the working temperature is greater than or equal to the second temperature threshold and less than the third temperature threshold, the method further includes:

further reducing the charging power output to the electric vehicle from the second charging power to a third charging power when the working temperature is still in the ascending trend.

In this step, when the working temperature exceeds the second temperature threshold and does not reach the third temperature threshold, in a case where the working temperature cannot be reduced by reducing the charging power from the first charging power to the second charging power, the charging power is further reduced to the third charging power, for example, the output charging power is reduced to ½ or ⅔ of the second charging power, thereby further reducing the temperature increased due to the high charging power. In addition, after the charging power is reduced to the third charging power, it is determined whether the working temperature is in the descending trend according to the collected working temperature. If it is determined that the working temperature is in the descending trend, the third charging power is maintained. If it is determined that the working temperature is still in an ascending trend, the third charging power may be further reduced to a fourth charging power. The time interval for collecting the working temperature may be obtained by the above method, and particularly when the working temperature is in the descending trend and between the second temperature threshold and the first temperature threshold, the time interval for collecting the working temperature can be further increased.

In an embodiment of the present disclosure, after reducing the charging power output to the electric vehicle from the first charging power to the second charging power, when the working temperature is greater than or equal to the second temperature threshold and less than the third temperature threshold, the method further includes:

stopping charging the electric vehicle when the working temperature is still in the ascending trend.

In an embodiment of the present disclosure, after further reducing the charging power output to the electric vehicle from the second charging power to the third charging power when the working temperature is still in the ascending trend, the method further includes:

when the third charging power is output to the electric vehicle, in a case where the working temperature decreases to a range between the first temperature threshold and the second temperature threshold, and then the working temperature is in the ascending trend and is greater than or equal to the second temperature threshold and less than the third temperature threshold again, further reducing the charging power output to the electric vehicle from the third charging power to a power lower than the third charging power.

In this step, when the electric vehicle is charged with the third charging power, the working temperature is in the descending trend due to the reduction of the charging power, and decreases from a range between the second temperature threshold and the third temperature threshold to a range between the first temperature threshold and the second temperature threshold. During the continuous charging with the third charging power, if the working temperature increases again and exceeds the second temperature threshold, it can be determined that the charging control box or the battery management system (BMS) of the electric vehicle may fail, and the charging power needs to be reduced again. The charging power currently in use may be reduced from the third charging power to the fourth charging power, such as ½ of the third charging power or any other charging power less than the third charging power, and the collection time interval may be shortened, and the next working temperature collected by the temperature detection unit may be used to determine whether the working temperature is still in the ascending trend, and to determine whether the third temperature threshold is reached.

In an embodiment of the present disclosure, after further reducing the charging power output to the electric vehicle from the second charging power to the third charging power when the working temperature is still in the ascending trend, the method further includes:

when the third charging power is output to the electric vehicle, in a case where the working temperature decreases to a range between the first temperature threshold and the second temperature threshold and then the working temperature is in the ascending trend, stopping charging the electric vehicle.

In an embodiment of the present disclosure, after further reducing the charging power output to the electric vehicle from the second charging power to the third charging power when the working temperature is still in the ascending trend, the method further includes:

increasing the charging power output to the electric vehicle from the third charging power to a power greater than or equal to the third charging power, when the third charging power is output to the electric vehicle and the working temperature decreases below the first temperature threshold.

In this step, when the electric vehicle is charged with the third charging power, the working temperature is in the descending trend due to the reduction of the charging power, and decreases from a range greater than or equal to the second temperature threshold and less than the third temperature threshold to a range between the first temperature threshold and the second temperature threshold. During continuous charging with the third charging power, if the working temperature continuously decreases to be lower than the first temperature threshold, a charging power greater than or equal to the third charging power may be used to charge, such as the initial first charging power may be used to charge the electric vehicle, so as to improve the charging efficiency. Next, with the increase of the charging power, the working temperature is in the ascending trend again, exceeding the first temperature threshold and being in the range between the first temperature threshold and the second temperature threshold and the range between the second temperature threshold and the third temperature threshold, at which time the foregoing steps are repeated to reduce the charging power output to the electric vehicle from the first charging power to the second charging power. When the working temperature is still in the ascending trend, it is necessary to further reduce the second charging power to the third charging power, and when the working temperature is greater than or equal to the third temperature threshold, the charging of the electric vehicle is stopped, i.e., the output charging power is zero. By repeating such circular processing, it is possible to maintain the high-speed charging of the electric vehicle in a safe charging manner, thereby shortening the charging time and improving the charging efficiency.

In an embodiment of the present disclosure, after increasing the charging power output to the electric vehicle from the third charging power to the power greater than or equal to the third charging power, when the third charging power is output to the electric vehicle and the working temperature decreases below the first temperature threshold, the method further includes:

reducing the power output to the electric vehicle when the working temperature exceeds the second temperature threshold again.

In this step, through two times of reducing regulations of the output charging power, the charging power is reduced from the first charging power to the second charging power and then to the third charging power. When the working temperature decreases below the first temperature threshold, the charging power output to the electric vehicle is restored from the third charging power to the first charging power, or may be increased to any value between the third charging power and the first charging power, or may be equal to the first charging power, thereby increasing the charging speed and improving the charging efficiency. Thereafter, the working temperature increases again and exceeds the second temperature threshold. At this time, if the first charging power output to the electric vehicle is reduced to the second charging power, and then reduced to the third charging power only when the working temperature is in the ascending trend and above the second temperature threshold as in the foregoing step, the power regulation may be repeated so that the working temperature increases above the second temperature threshold again. Therefore, in this step, the first charging power may be directly reduced to the third charging power, so that the working temperature can be decreased as soon as possible, and frequent actions of the charging power can be avoided.

In an embodiment of the present disclosure, after reducing the charging power output to the electric vehicle from the first charging power to a second charging power, when the working temperature is greater than or equal to the second temperature threshold and less than a third temperature threshold, the method further includes:

further increasing the power output to the electric vehicle to a power greater than or equal to the second charging power and less than or equal to the first charging power, when the working temperature is in the descending trend.

In an embodiment of the present disclosure, after stopping charging the electric vehicle when the working temperature is greater than or equal to the third temperature threshold, the method further includes:

restoring the charging power output to the electric vehicle to be greater than zero, when the working temperature decreases to the second temperature threshold.

In this step, no matter whether the charging current is output to the electric vehicle at the first charging power, the second charging power, or the third charging power, the output of the charging current of the electric vehicle is stopped if the charging current causes the working temperature in the power connector to exceed the third temperature threshold, thereby ensuring the charging safety. After the output of the charging current is stopped, the working temperature will decrease with time. At this time, the temperature detection unit may increase the temperature collection time interval to obtain the working temperature in the power connector. The obtained working temperature is determined by the charging control unit, and when it is determined that the working temperature is less than the second temperature threshold, the charging current of the electric vehicle is restored, and for example, the electric vehicle may be charged with the initial rated power (greater than zero), i.e., the first charging power.

In an embodiment of the present disclosure, after stopping charging the electric vehicle when the working temperature is greater than or equal to the third temperature threshold, the method further includes:

restoring the charging power output to the electric vehicle to be greater than zero, when the working temperature decreases below the third temperature threshold.

In this step, when the working temperature exceeds the third temperature threshold and the charging of the electric vehicle is stopped, the working temperature slowly decreases and falls below the third temperature threshold again, and the charging control unit restores the charging of the electric vehicle at a low power, such as the third charging power or the fourth charging power.

In an embodiment of the present disclosure, after stopping charging the electric vehicle when the working temperature is greater than or equal to the third temperature threshold, the method further includes:

restoring the charging of the electric vehicle when the working temperature decreases to the first temperature threshold, and determining the charging power according to a climate condition.

In this step, when stopping charging the electric vehicle since the working temperature exceeds the third temperature threshold, the working temperature in the power connector gradually decreases as the charging current is stopped. When the working temperature is lower than the first temperature threshold, the charging of the electric vehicle may be restored, and the restored charging power may be determined according to the current climate condition. For example, in a southern region where the temperature is high in summer, although the working temperature of the power connector decreases to the first temperature threshold, the temperature of the power connector may rapidly increase to the third temperature threshold if the first charging power is restored. Therefore, the charging power is reduced to the second charging power to restore the charging current of the electric vehicle. In a northern region where the temperature is low in summer, the charging power may be restored to the first charging power to charge the electric vehicle.

In an embodiment of the present disclosure, it is determined whether a working state of the temperature detection unit is a normal working state according to the obtained working temperature, and the working state of the temperature detection unit is recorded;

after stopping charging the electric vehicle when the working temperature is greater than or equal to the third temperature threshold, the method further includes:

stopping charging the electric vehicle until the electric vehicle is powered on again, and querying the working state of the temperature detection unit;

restoring the first charging power output to the electric vehicle if the working state of the temperature detection unit is a normal working state;

continuing stopping charging the electric vehicle if the working state of the temperature detection unit is an abnormal working state.

In this step, when the working temperature obtained by the temperature detection unit exceeds a preset range, for example, by taking a voltage of a thermistor collected by the temperature detection unit to represent the working temperature, when the voltage value exceeds a voltage value representing a working temperature of 200° C. or lower than a voltage value representing a working temperature of −60° C., it is considered that the temperature detection unit is damaged and cannot work normally, at which time the working state is an abnormal working state. When the thermistor is open-circuited, the voltage value may be high. For example, when the voltage value of the thermistor is 5.5 V, it means that the working temperature reaches 200° C., and when the thermistor is open-circuited, the voltage value may be zero. For example, when the voltage value of the thermistor is 0 V, it means that the working temperature reaches −60° C. When the above situations occur, the current working state of the temperature detection unit is recorded in the memory. When the working temperature is greater than the third temperature threshold and the electric vehicle is stopped from being charged, the power connector is disconnected from the charging power supply, at which time the charging control unit is powered off. When the power connector is reconnected to the charging power supply, the charging control unit is powered on again, the system performs self-checking, and the charging control unit queries the working state of the temperature detection unit prior to being powered off in the memory. In case of the normal working state, the process returns to step 201 for restart; and in case of the abnormal working state, it indicates that the charging control apparatus is damaged and cannot work normally, and the over-temperature protection function will fail if the charging continues, causing a potential safety hazard of the charging, and therefore, the charging of the electric vehicle is kept being stopped.

In an embodiment of the present disclosure, maintaining the first charging power output to an electric vehicle and triggering the first prompt signal, when the working temperature is greater than or equal to the first temperature threshold and less than the second temperature threshold, may be replaced by:

reducing the charging power output to the electric vehicle from the first charging power when the working temperature is greater than or equal to a first temperature threshold and less than a second temperature threshold. For example, the charging power may be reduced to a range between the first charging power and the second charging power, or to the second charging power. Meanwhile, the first prompt signal may be triggered.

In an embodiment of the present disclosure, after reducing the charging power output to the electric vehicle from the first charging power when the working temperature is greater than or equal to the first temperature threshold and less than the second temperature threshold, the method further includes:

increasing the charging power output to the electric vehicle from the first charging power to a power greater than or equal to the first charging power when the working temperature decreases below the first temperature threshold.

Through the above method according to the embodiment of the present disclosure, the charging efficiency can be improved and the charging time can be shortened on the premise of ensuring the charging safety of the electric vehicle. By disposing the temperature detection unit at the power connector, the reaction speed of the temperature detection can be increased, and the cable cost can be reduced.

Figure 3:
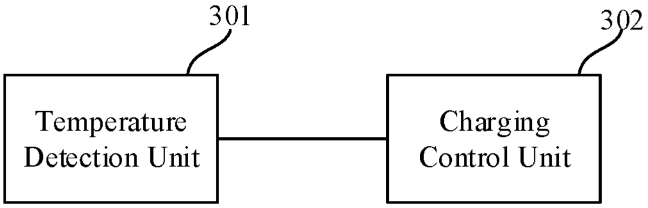
FIG. 3 illustrates a schematic structural diagram of an electric vehicle charging control apparatus according to an embodiment of the present disclosure.

FIG. 3 illustrates a schematic structural diagram of an electric vehicle charging control apparatus according to an embodiment of the present disclosure. FIG. 3 depicts an apparatus for controlling charging of an electric vehicle according to a working temperature. The apparatus may be implemented by a dedicated chip or a general chip, or executable on a single chip microcomputer or an industrial computer, wherein functional modules may be implemented by software or logic circuits, thereby implementing the method illustrated in FIG. 2. The apparatus specifically includes:

a temperature detection unit 301 configured to periodically obtain a working temperature;

a charging control unit 302 configured to: maintain a charging power output to an electric vehicle at a first charging power and trigger a first prompt signal, when the working temperature is greater than or equal to a first temperature threshold and less than a second temperature threshold; and reduce the charging power output to the electric vehicle from the first charging power to a second charging power, when the working temperature is greater than or equal to the second temperature threshold and less than a third temperature threshold.

The charging control unit 302 is further configured to stop charging the electric vehicle when the working temperature is greater than or equal to the third temperature threshold.

Figure 4:
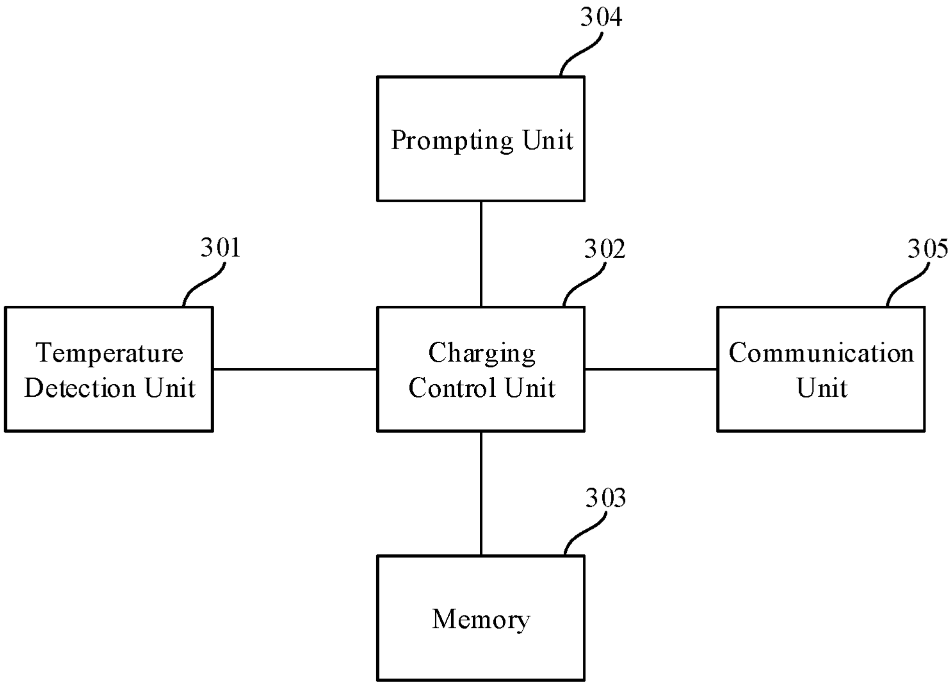
FIG. 4 illustrates a specific structural diagram of an electric vehicle charging control apparatus according to an embodiment of the present disclosure.

In an embodiment of the present disclosure, FIG. 4 illustrates a specific structural diagram of an electric vehicle charging control apparatus according to an embodiment of the present disclosure, in which an internal logical structure of each functional unit is refined. The apparatus further includes:

a memory 303 configured to store time specified by a user.

The temperature detection unit 301 is configured to obtain a working temperature of a power connector according to the specified time.

In this embodiment, the memory 303 may be a non-volatile memory, for example including a programmable read-only memory, an electrically erasable programmable read only memory, and a flash memory. The programmable read-only memory is internally provided with fuses in rows and columns which can be burned off by current according to the needs of users (manufacturers) to write the required data and program, and the fuses cannot be recovered once being burned off, i.e., the data cannot be changed. The electrically erasable programmable read only memory may operate on a similar principle to an EPROM, but the erasing adopts a high electric field and no transparent window is required. The flash memory is a form of an electrically erasable programmable read-only memory, and is a memory allowed to be erased or written multiple times during operation. The flash memory is used for the general data storage, and the data exchange and transmission between a computer and any other digital product, such as a memory card or a USB flash disk.

In an embodiment of the present disclosure, the charging control unit 302 is configured to set a time interval for obtaining the working temperature according to a change trend of the working temperature;

the temperature detection unit 301 is configured to collect the working temperature according to the time interval for obtaining the working temperature set by the charging control unit 302.

In an embodiment of the present disclosure, the charging control unit 302 is configured to set a time interval for obtaining the working temperature according to a climate condition;

the temperature detection unit 301 is configured to collect the working temperature according to the time interval for obtaining the working temperature set by the charging control unit 302. In an embodiment of the present disclosure, the apparatus further includes a prompting unit 304 configured to prompt a user of a state of the current working temperature by means of sound and light.

In an embodiment of the present disclosure, the apparatus further includes a communication unit 305 configured to transmit first prompt information prompting a user that a current charging element temperature is high to an intelligent terminal of the user.

In an embodiment of the present disclosure, the charging control unit 302 is further configured to further reduce the charging power output to the electric vehicle from the second charging power to a third charging power when the working temperature is still in an ascending trend.

In an embodiment of the present disclosure, the charging control unit 302 is further configured to, when the third charging power is output to the electric vehicle, in a case where the working temperature decreases to a range between the first temperature threshold and the second temperature threshold, and then the working temperature is in the ascending trend and is greater than or equal to the second temperature threshold and less than the third temperature threshold again, further reduce the charging power output to the electric vehicle from the third charging power to a fourth charging power.

In an embodiment of the present disclosure, the charging control unit 302 is further configured to increase the charging power output to the electric vehicle from the third charging power to the first charging power, when the third charging power is output to the electric vehicle and the working temperature decreases below the first temperature threshold.

In an embodiment of the present disclosure, the charging control unit 302 is further configured to restore the charging power output to the electric vehicle as the first charging power when the working temperature decreases to the first temperature threshold.

In an embodiment of the present disclosure, the charging control unit 302 is further configured to reduce the charging power output to the electric vehicle from the first charging power to the third charging power when the working temperature exceeds the second temperature threshold again.

In an embodiment of the present disclosure, the charging control unit 302 is further configured to, when the working temperature is greater than or equal to the third temperature threshold and the electric vehicle is stopped from being charged, in a case where the working temperature decreases to the first temperature threshold, restore the charging power output to the electric vehicle as the first charging power.

In an embodiment of the present disclosure, the charging control unit 302 is further configured to, when the working temperature is greater than or equal to the third temperature threshold and the electric vehicle is stopped from being charged, in a case where the working temperature decreases below the third temperature threshold, restore the charging power output to the electric vehicle as the third charging power.

In an embodiment of the present disclosure, the charging control unit 302 is further configured to determine whether the temperature detection unit is in a normal working state according to the obtained working temperature, and the memory 303 is further configured to record a working state of the temperature detection unit;

the charging control unit 302 is further configured to, when the working temperature is greater than or equal to the third temperature threshold and the electric vehicle is stopped from being charged, stop charging the electric vehicle until the electric vehicle is powered on again, and query the working state of the temperature detection unit; restore the charging power output to the electric vehicle as the first charging power if the working state of the temperature detection unit is a normal working state; and continue stopping charging the electric vehicle if the working state of the temperature detection unit is an abnormal working state.

In an embodiment of the present disclosure, the charging control unit 302 is further configured to restore the charging of the electric vehicle when the working temperature decreases to the first temperature threshold, and determine the charging power according to the climate condition.

Through the apparatus according to the embodiment of the present disclosure, the charging efficiency can be improved and the charging time can be shortened on the premise of ensuring the charging safety of the electric vehicle. By disposing the temperature detection unit at the power connector, the reaction speed of the temperature detection can be increased, and the cable cost can be reduced.

Figure 5:
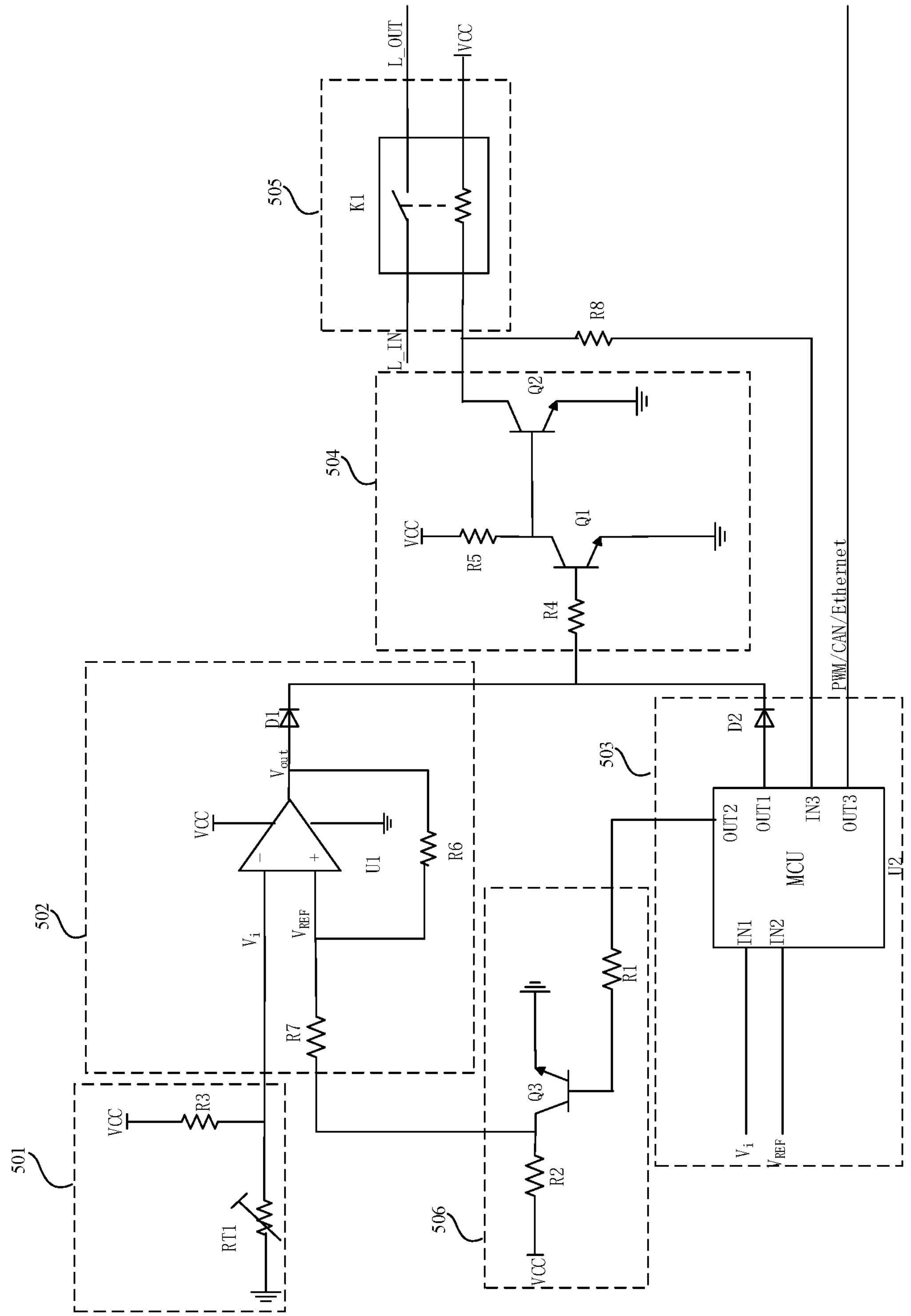
FIG. 5 illustrates a specific circuit diagram of a charging control apparatus according to an embodiment of the present disclosure.

FIG. 5 illustrates a specific circuit diagram of a charging control apparatus according to an embodiment of the present disclosure, and depicts a circuit structure of the charging control apparatus. The temperature detection unit 501 may be a thermistor, a thermocouple, a resistance temperature detector, a digital sensor, etc., where a thermistor with a positive temperature coefficient (PTC) or a negative temperature coefficient (NTC) may be adopted, such as an NTC type thermistor RT1 illustrated in FIG. 5, and information of the working temperatures (e.g., temperatures of electrical elements) reflected by different temperature detection units may be expressed as different temperature voltages. In this embodiment, the temperature detection unit 501 is further connected to a voltage division resistor R3 configured to set the temperature voltage output by the temperature detection unit to meet the requirement of a comparison unit 502. The temperature detection unit 501 may be disposed on a live wire terminal and/or a neutral wire terminal inside the power connector, and the temperature detection unit 501 and the live wire terminal and/or the neutral wire terminal inside the power connector are fixed by insulative and heat-conductive silica gel.

As an aspect of the embodiments of the present disclosure, the comparison unit 502 is a hysteresis comparator, a first input end of which is connected to the temperature voltage output by the temperature detection unit 501, a second input end of which is connected to a reference voltage through a resistor R8, and an output end of which is connected to an input end of a driving unit 504 to output a first comparison result voltage to the driving unit 504, and is connected to the second input end through a resistor R6 connected in series.

In a case where there is only one reference voltage, when an amplitude of the temperature voltage input by the first input end of the comparison unit is close to the reference voltage, it is possible to cause an erroneous jump of the output voltage if a noise interference of the first input end is large and a comparison response speed is fast enough. In order to increase the anti-interference capability of the comparison unit, the embodiment provides the hysteresis comparator, which means that two reference voltages are provided. When the input temperature voltage transitions from a low level to a high level, the output of the comparison unit 502 will not change unless the temperature voltage reaches a first reference voltage; and when the input temperature voltage transitions from a high level to a low level, the output of the comparison unit will not change unless the input temperature voltage decreases to a second reference voltage. Therefore, the structure of the comparison unit in the above embodiment has a hysteresis, i.e., an inertia, so that a slight change of the input temperature voltage will not cause the jump of the output voltage of the comparison unit, and then the comparison unit has the anti-interference capability.

The first comparison result voltage output by the comparison unit 502 may be at a high level or a low level, which depends on the structure of the driving unit 504, and has the same meaning as a high level and a low level of the second comparison result voltage output by the charging control unit 503 according to the comparison between the temperature voltage and a preset threshold as described later. That is, for example, when the first comparison result voltage output by the comparison unit 502 indicates that the working temperature (the temperature voltage) is higher than the preset temperature (the reference voltage), the first comparison result voltage is output at a high level. For the sake of simplicity, the drawing for this embodiment only illustrates one comparison unit 502, which may be configured to compare the working temperature with the third temperature threshold, and there may be other comparison units configured to compare the working temperature with the first temperature threshold and the second temperature threshold. At this time, the charging control unit 503 should output the second comparison result voltage at a high level when judging that the working temperature (temperature voltage) is higher than the preset temperature (the first temperature threshold, the second temperature threshold or the third temperature threshold), and vice versa. In this way, the high levels of the output comparison results are of the same meaning, and the low levels of the output comparison results are of the same meaning, thereby realizing the multiple temperature control protection.

As an aspect of the embodiments of the present disclosure, the charging control unit 503 is connected to the temperature detection unit 501 to obtain the temperature voltage; and the charging control unit 503 is connected to the input end of the driving unit 504 to output the second comparison result voltage to the driving unit 504.

In this embodiment, the charging control unit 503 may be a microprocessor (MCU), which receives a signal through IN pins (IN1 to IN3), output the signal through OUT pins (OUT1 to OUT3), and converts the temperature voltage into a digital form to be compared with a preset threshold. For example, when a numerical value of the temperature voltage is greater than or equal to the third temperature threshold, a second comparison result voltage indicating to switch off a switch unit 505 is output, and when the numerical value of the temperature voltage is less than the first temperature threshold, a second comparison result voltage indicating to switch on the switch unit 505 is output, where the second comparison result voltage may be at a high level or a low level, depending on the structure of the driving unit 504.

As an aspect of the embodiments of the present disclosure, the driving unit 504 includes a first transistor Q1, and a second triode Q2 is omitted compared with FIG. 5. The first transistor Q1 includes a collector connected to a power supply VCC, a base connected to the comparison unit 502 and the charging control unit 503 for receiving both the first comparison result voltage output by the comparison unit 502 and the second comparison result voltage output by the charging control unit 503, and an emitter that is grounded.

The collector is further connected to the switch unit 505 which is switched off when the first transistor Q1 is turned on and switched on when the first transistor Q1 is turned off.

In this embodiment, when the base is connected to the comparison unit 502 and the charging control unit 103 and receives both the first comparison result voltage output by the comparison unit 502 and the second comparison result voltage output by the charging control unit 503, the first transistor Q1 is turned on when either of the first comparison result voltage and the second comparison result voltage is at a high level. That is, when the comparison unit 502 determines that the current working temperature exceeds the third temperature threshold and outputs the first comparison result voltage at a high level, or the charging control unit 503 determines that the current working temperature exceeds the third temperature threshold and outputs the second comparison result voltage at a high level, the base of the first transistor Q1 receives the high level so as to be turned on, thereby switching off the switch unit 505.

As an aspect of the embodiments of the present disclosure, the driving unit 504 includes a first transistor Q1 and a second transistor Q2. The first transistor Q1 has a collector connected to a power supply VCC, a base connected to the comparison unit 502 and the charging control unit 503 for receiving both the first comparison result voltage output by the comparison unit 502 and the second comparison result voltage output by the charging control unit 503, and an emitter that is grounded. The second transistor Q2 includes a collector connected to the switch unit 505, a base connected to the collector of the first transistor Q1, and an emitter that is grounded. When the first transistor Q1 is turned on, the second transistor Q2 is turned off and the switch unit 505 is switched off. When the first transistor Q1 is turned off, the second transistor Q2 is turned on and the switch unit 505 is switched on.

In the above embodiment, the function of the driving unit 504 may also be realized by other means, and a PNP triode or an MOS transistor may be used to drive the switch unit 505, and the switch unit may be, for example, a relay. For example, the first comparison result voltage output by the comparison unit 502 may be converted into a digital form to be OR-operated with the second comparison result voltage in a digital form output by the charging control unit 503. When one of the first and second comparison results in digital form is at a high level, it means that the working temperature exceeds the third temperature threshold, and the switch unit 505 is switched off. The above judgment and operation may be realized by a gate circuit in a digital circuit, or any other form of judgment and operation circuit, which will not be described here.

As an aspect of the embodiments of the present disclosure, the charging control apparatus further includes a compensation unit 506, which is connected between the comparison unit 502 and the charging control unit 503. When detecting a deviation of the reference voltage, the charging control unit 503 outputs a regulation voltage to the compensation unit 506 to regulate the reference voltage.

In this embodiment, when the reference voltage drifts due to aging of the electrical components that output the reference voltage to the comparison unit 502 or changing of the electrical components resulting from the change of the working temperature, the reference voltage may be regulated by the charging control unit 503 so as to be more accurate, thereby improving the accuracy of temperature judgment by the comparison unit 502. The charging control unit 503 obtain the reference voltage, generates a regulation voltage for the reference voltage according to the comparison between the temperature voltage and the preset threshold, and applies the regulation voltage to the reference voltage.

As an aspect of the embodiments of the present disclosure, the compensation unit 506 further includes a third transistor Q3, which includes a collector connected to a power supply VCC and the reference voltage of the comparison unit 502, a base connected to the charging control unit 503, and an emitter that is grounded. When the charging control unit 503 determines that the received reference voltage is not equal to a preset threshold, the charging control unit 503 outputs a regulation voltage to the base of the third transistor Q3 to control the reference voltage on the collector of the third transistor Q3.

In this embodiment, an input pin of the charging control unit 503 is connected to the reference voltage of the second input end of the comparison unit 502 to obtain the reference voltage of the second input end of the comparison unit 502. When the reference voltage drifts due to the change of the electrical element, the reference voltage obtained by the charging control unit 503 is not equal to the preset threshold. For example, the set reference voltage is 0.5 V, and the set preset threshold is also 0.5 V, but the drifted reference voltage is 0.48 V. At this time, when determining that the collected reference voltage is different from the preset threshold, the charging control unit 503 controls the output pin to output a regulation voltage, and turns on the third transistor Q3, so that the reference voltage input to the second input end of the comparison unit 502 can be regulated from 0.48 V back to the set 0.5 V.

As an aspect of the embodiments of the present disclosure, the charging control unit 503 further includes a first output pin configured to output a pulse modulation signal (PWM) according to the temperature voltage to regulate the power of the output charging current, and output the pulse modulation signal to the electric vehicle through an interface connected to the electric vehicle.

In this embodiment, as the temperature of a component of the charging device increases or decreases, the charging control unit 503 may reduce or increase the power of the output charging current according to the degree of the temperature increase or decrease (when increasing, the temperature does not reach the preset threshold, i.e., the temperature does not exceed a safe charging temperature). For example, during AC charging, the charging current is regulated from 8 A to 6 A by the PWM signal due to the temperature increases. The PWM signal for regulating the output charging power is transmitted to a battery management system (BMS) of the electric vehicle, and the BMS system charges the battery with the corresponding charging current by a power regulation unit of the electric vehicle, thereby reducing the intensity of the charging current. The charging of the electric vehicle can be maintained after the temperature of components of the charging control apparatus increases, rather than being directly stopped as in the prior art, so that the charging efficiency can be improved, and the user's experience in charging the electric vehicle can be improved.

As an aspect of the embodiments of the present disclosure, the charging control unit 503 further includes a second output pin configured to output a charging power regulation signal (CAN/Ethernet) according to the temperature voltage, and output the charging power regulation signal to the electric vehicle through an interface connected to the electric vehicle.

The charging control apparatus further includes a power regulation unit connected between the charging control unit 503 and the switch unit 505, and configured to regulate the power of the output charging current according to the charging power regulation signal.

In this embodiment, as the temperature of a component, such as a power connector, of the charging device increases or decreases, the charging control unit 503 may reduce or increase the power of the output charging current according to the degree of the temperature increase or decrease (when increasing, the temperature does not reach the preset threshold, i.e., the temperature does not exceed a safe charging temperature). For example, during DC charging, the charging control unit 503 reduce or increase the power of the charging current output by the power regulation unit by outputting a charging power regulation signal to the power regulation unit. When the working temperature in the power connector exceeds the third temperature threshold, i.e., the safe charging temperature, the charging control unit 503 or the comparison unit 502 outputs a driving signal to drive the switch unit 505 to be switched off. When the switch unit 505 is switched off, the power regulation unit stops outputting the charging current to the electric vehicle, thereby decreasing the temperature in the charging control apparatus and the temperature of the battery of the electric vehicle and ensuring the charging safety. The charging power regulation signal output by the charging control unit 503 may also be transmitted to the BMS system of the electric vehicle through a CAN bus or an Ethernet bus of a charging gun on the charging control apparatus, so that the BMS system can charge the battery at corresponding power with the charging current output from the switch unit 505 of the charging control apparatus according to the charging power regulation signal, thereby reducing the intensity of the charging current. Therefore, the charging of the electric vehicle can be maintained after the temperature of components of the charging control apparatus increases, rather than being directly stopped as in the prior art, so that the charging efficiency can be improved, and the user's experience in charging the electric vehicle can be improved.

Referring to FIG. 5, VCC is an anode (hereinafter referred to as a power supply for abbreviation) of a power supply voltage source, the GND is a cathode of the power supply voltage source, $V_{REF}$ is a reference voltage, i.e., a set temperature threshold, which is connected to a resistor R7, and the other end of the resistor R7 is connected to a positive input pin (i.e., a second input end) of an operational amplifier. The reference voltage $V_{REF}$ may be a fixed value, or a preset threshold inside the charging control unit 503, in which case the charging control apparatus can automatically regulate the temperature threshold. A thermistor RT1 is a thermosensitive element, with one end connected to the ground, and the other end connected to the resistor R3 to constitute the temperature detection unit 501 which is connected to an input end of the comparison unit 502, i.e., a connection point between the resistor R3 and the thermistor RT1 is connected to a negative input pin (i.e., a first input end) of the operational amplifier U1. The thermistor RT1 and the resistor R3 constitute a voltage division circuit, and the thermistor RT1 may be an NTC type thermistor. When the working temperature in the power connector increases, a resistance value of thermistor RT1 decreases, and a voltage value of a divided temperature voltage $V_i$ decreases, whereas when the temperature decreases, the $V_i$ increases. The resistor R6 is a feedback resistor connected between an output pin (an output end) of the operational amplifier U1 and the positive input pin (i.e., the second input end).

When $V_i<V_{REF}$, the operational amplifier U1 outputs a high level; and when $V_i>V_{REF}$, U1 outputs a low level. $V_{out}$ is the output end of the operational amplifier U1, and the $V_{out}$ is connected to one end of a diode D1, the other end of the diode D1 is connected to a resistor R4, the other end of the resistor R4 is connected to the base of the first transistor Q1 of the driving unit 504. A resistor R5 has one end connected to the power supply VCC and the other end connected to the collector of the first transistor Q1. The second transistor Q2 has the base connected to a connection point between the collector of the first transistor Q1 and the resistor R5, the emitter connected to the ground, and the collector connected to the control end of the switch unit 505. A switch K1 of a power supply network is used to control a path of the charging current supplied to the electric vehicle, and when the switch K1 is switched off, the charging current supplied to the electric vehicle is directly cut off to terminate the charging process. When the $V_{out}$ outputs a high level, the first transistor Q1 is turned on and the second transistor Q2 is turned off, and the switch K1 of a power supply network is switched off, so as to cut off the charging current output to the electric vehicle. When the $V_{out}$ outputs a low level, the first transistor Q1 is turned off, the second transistor Q2 is turned on, and the switch K1 of the power supply network is switched on to maintain the charging current output to the electric vehicle. L_IN, K1 and L_OUT constitute a path in the main power supply network. When the working temperature exceeds the third temperature threshold, the $V_{out}$ outputs a high level to disconnect the power supply network, and the charging current output by L_OUT is 0.

The thermistor RT1 may be integrated with other electrical components such as the operational amplifier U1 or disposed separately. There may be one or more thermistors RT1, which may be located at different parts of the charging control apparatus to collect the working temperatures of those different parts or the temperatures of the electrical components, and for example, the thermistor RT1 is mounted in the power connector.

The operational amplifier U1 may be a hysteresis comparator to avoid the frequency switching of the switch unit 505 between a switched-on state and a switched-off state when the working temperature of the switch K1 is close to the temperature threshold. When the working temperature is higher than or equal to T3 (the third temperature threshold), the switch unit 505 is switched off, and when the working temperature is lower than or equal to T1 (the first temperature threshold), the switch unit 505 is switched on, where T3>T1. A hysteresis voltage width ΔV is determined by the equation: $\Delta V=(R7/R6)\times(VH-VL)$, where VH is the VCC and VL is 0V. Two threshold voltages u+ and u− of the hysteresis comparator are determined by the equations: $u+=(VH-V_{REF})\times R7/(R7+R6)$, $u-=(VL-V_{REF})\times R7/(R7+R6)$. When the output voltage $V_{out}$ of the hysteresis comparator is equal to VH, then $V_{REF}$=1.1+. When the temperature voltage $V_i$ is greater than or equal to $V_{REF}$, the output voltage Vons of the hysteresis comparator is changed to VL, and $V_{REF}$ is also changed to u−. Under this condition, when the temperature voltage $V_i$ is less than $V_{REF}$, the output voltage $V_{out}$ is changed to VH. Since $u+-u-=\Delta V$, the hysteresis comparator has a lower sensitivity than the ordinary comparator, but its anti-interference capability is greatly improved.

In order to improve the charging safety of the electric vehicle, the charging control unit 503 collects the temperature voltage $V_i$ and the reference voltage $V_{REF}$. When it is detected that the reference voltage $V_{REF}$ deviates from the preset threshold, i.e., the reference voltage $V_{REF}$ changes, the compensation unit 506 regulates and corrects the value of the reference voltage $V_{REF}$ to improve the accuracy of the temperature judgment. One output end of the charging control unit 503 is connected to the resistor R1, the other end of the resistor R1 is connected to the base of the third transistor Q3, the emitter of the third transistor Q3 is connected to the GND, the collector of the third transistor Q3 is connected to one end of the resistor R2 and the reference voltage $V_{REF}$, and the other end of the resistor R2 is connected to the power supply VCC. The charging control unit 503 outputs a regulated voltage to control the duty ratio of the third transistor Q3, so as to regulate the reference voltage $V_{REF}$.

The charging control unit 503 also detects the state of the switch K1 through a feedback of the resistor R8 connected thereto. When the detected working temperature exceeds the third temperature threshold and the switch K1 remains in a switched-on state, it means that the comparison unit 502 fails to control the switch K1. The charging control unit 503 compares the V1 with the preset threshold, and outputs a high level when the Vi reaches or exceeds the preset threshold, and turns on the first transistor Q1 through the diode D2, and the second transistor Q2 is turned off, thereby disconnecting the power supply network. The comparison unit 502 and the charging control unit 503 realize a dual detection of the temperature detection unit 501 and a dual control of the driving unit 504, thereby improving the charging safety of the electric vehicle.

Figure 6A:
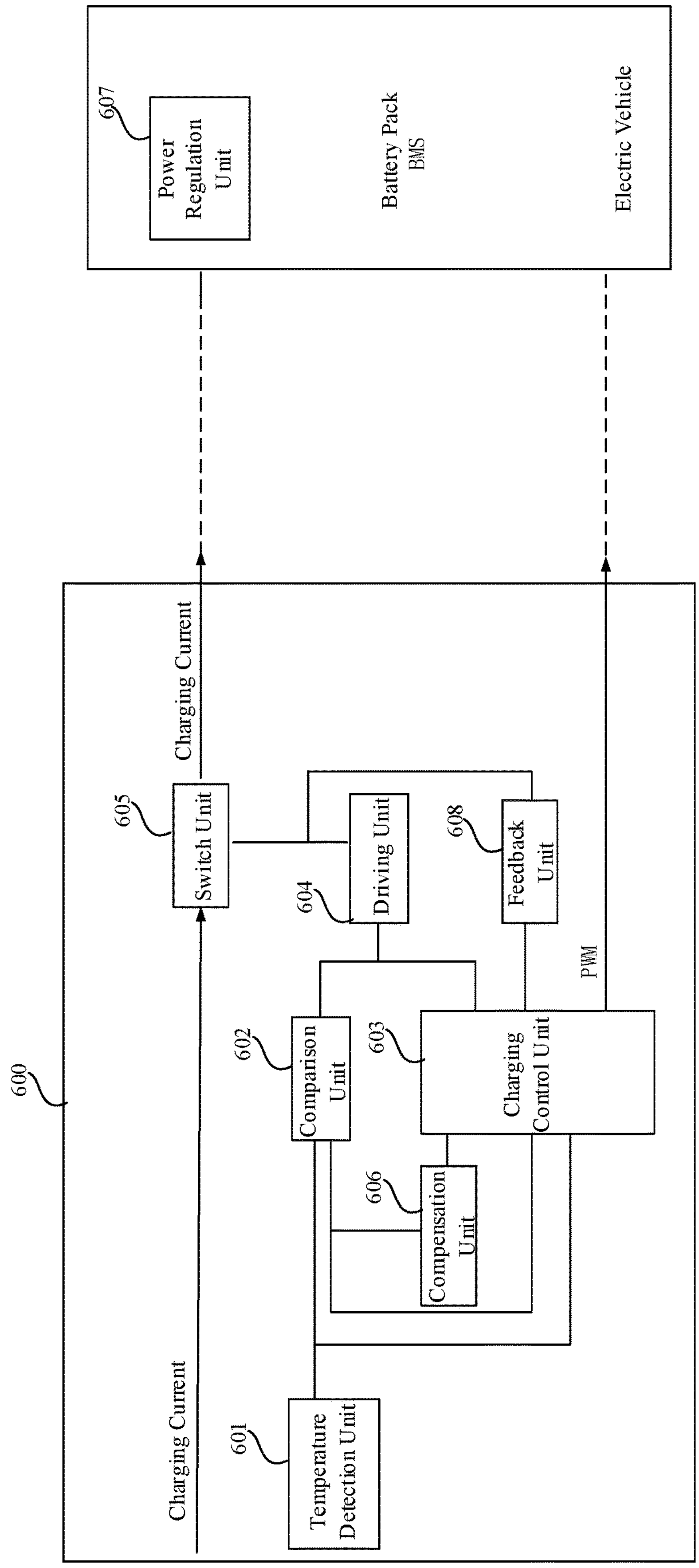
FIG. 6*a* illustrates a schematic diagram of a charging control apparatus and a charging structure for an electric vehicle according to an embodiment of present disclosure.

FIG. 6*a* illustrates a schematic diagram of a charging control apparatus and a charging structure for an electric vehicle according to an embodiment of the present disclosure, where a charging control box is an AC charging system. When the working temperature increases but does not exceed a set third temperature threshold, a charging control unit 603 of a charging control apparatus 600 modifies a duty ratio of a communication signal. For example, when the charging current is 8 A, the corresponding duty ratio (PWM signal) is 13.3%, and when the charging current is 6 A, the corresponding duty ratio value (PWM signal) is 10%, so as to regulate the power of the charging current. The charging control unit 603 outputs the modified communication signal to a power regulation unit 607 of the electric vehicle, and the power regulation unit 607 reduces the intensity of the charging current under the control of the BMS system of the electric vehicle. When the temperature detection unit 601 detects that the working temperature in the power connector exceeds the third temperature threshold, the switch unit 605 is switched off to stop charging the electric vehicle. In other embodiments, the charging control unit 603 may also output a control signal of voltage to regulate the charging current.

In FIG. 6*a*, a feedback unit 608 is further included to obtain a driving signal output by the driving unit 604, so that the charging control unit 603 can determine whether the driving unit 604 correctly drives the switch unit 605.

Figure 6B:
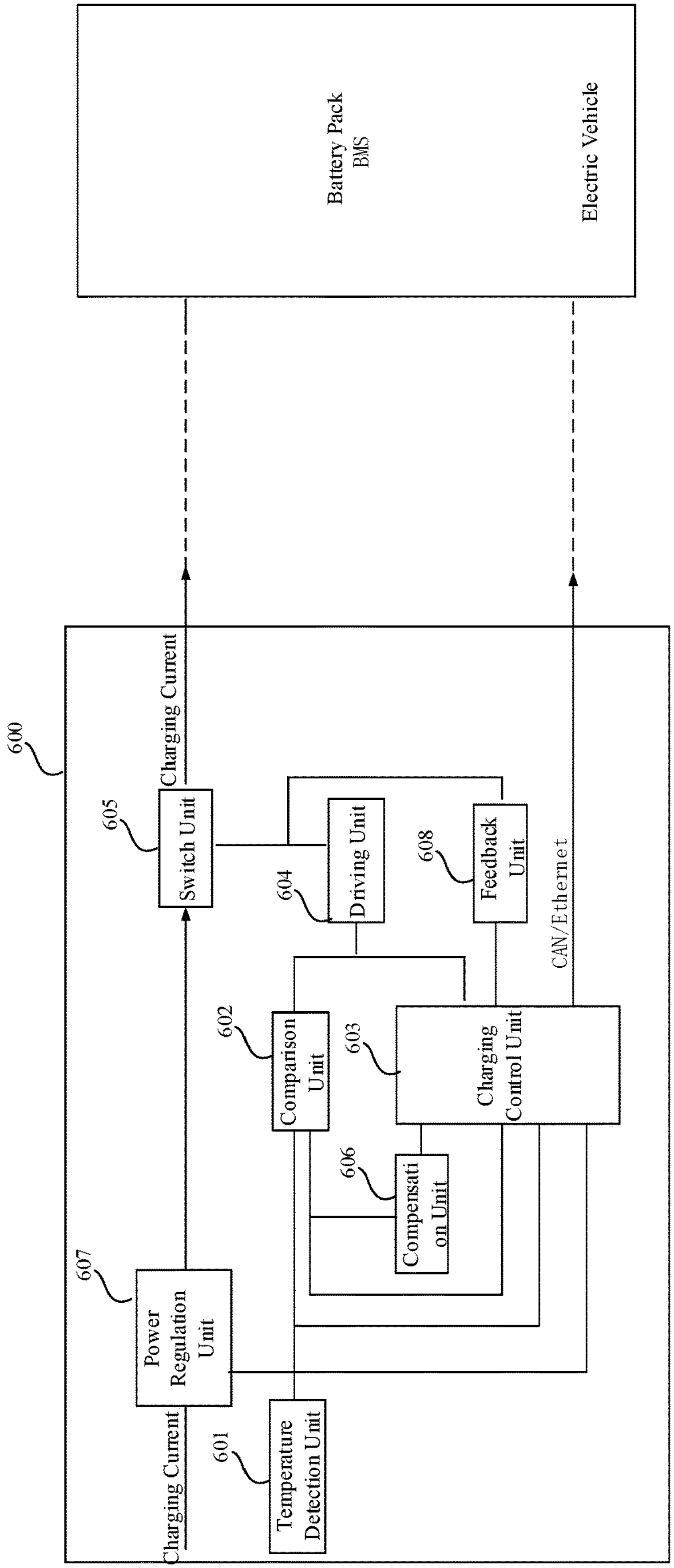
FIG. 6*b* illustrates a schematic diagram of a charging control apparatus and a charging structure for an electric vehicle according to another embodiment of present disclosure.

FIG. 6*b* illustrates a schematic diagram of a charging control apparatus and a charging structure for an electric vehicle according to another embodiment of present disclosure, where a charging control box is a DC charging system. When the working temperature increases but does not exceed a set third temperature threshold, the charging control unit 603 of the charging control apparatus 600 regulates the charging power to generate a charging power regulation signal, which is transmitted to the electric vehicle in the form of a CAN message through a CAN bus interface in a charging gun connected to the electric vehicle, thereby reducing the power of the charging current. Moreover, the charging power regulation signal is further output to the power regulation unit 607 in the charging control apparatus, and the power regulation unit 607 regulates the power of the output charging current (regulates the current or the voltage, or both) according to the charging power regulation signal, so as to charge the battery of the electric vehicle.

The power regulation unit 607 is configured to receive the charging current, regulates the power of the charging current and outputs it to the electric vehicle through the switch unit 605.

In the above embodiment, the temperatures of the charging parts can be decreased by reducing the power of the charging current to charge the battery of the electric vehicle. When the temperature of the charging control apparatus is lower than another temperature threshold (e.g., the first temperature threshold), the working temperature in the power connector can be obtained by the temperature detection unit 601, and then the charging control unit 603 outputs a control command to the power regulation unit 607 according to the working temperature to restore the power of charging current, thereby improving the charging speed.

Figure 7A:
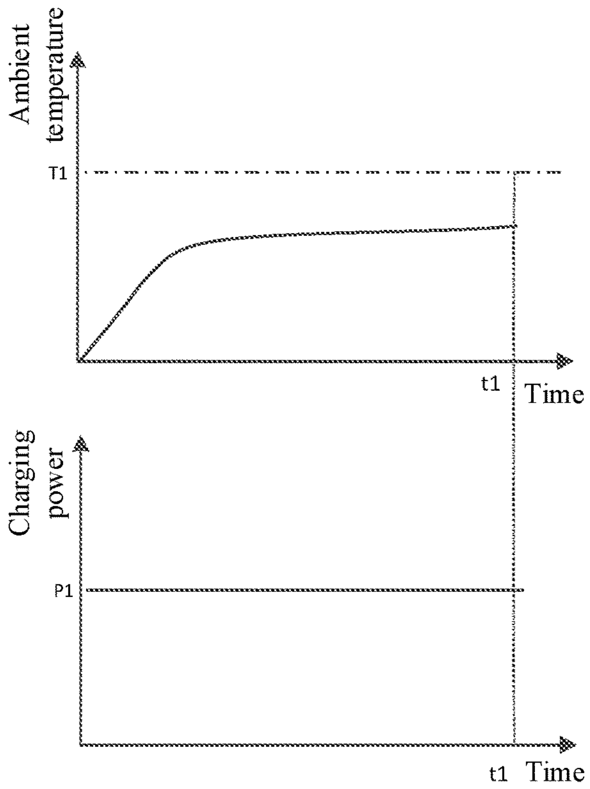
FIG. 7*a* to FIG. 7*i* illustrate schematic diagrams of control of charging power according to a working temperature in a charging process of an electric vehicle according to an embodiment of present disclosure.

FIG. 7*a* illustrates a schematic diagram of control of charging power according to a working temperature in a charging process of an electric vehicle according to an embodiment of present disclosure. FIG. 7*a* depicts that the electric vehicle is charged from timing to, the working temperature in the power connector obtained by the temperature detection unit increases with time and still does not exceed a first temperature threshold T1 till timing t1, at which time the charging control unit keeps charging the electric vehicle with a first charging power P1. During the period between timing t0 to timing t1, the temperature detection unit continuously shortens the time interval for collecting the working temperature in the power connector according to the ascending trend of the working temperature, and collects the working temperature for multiple times.

Figure 7B:
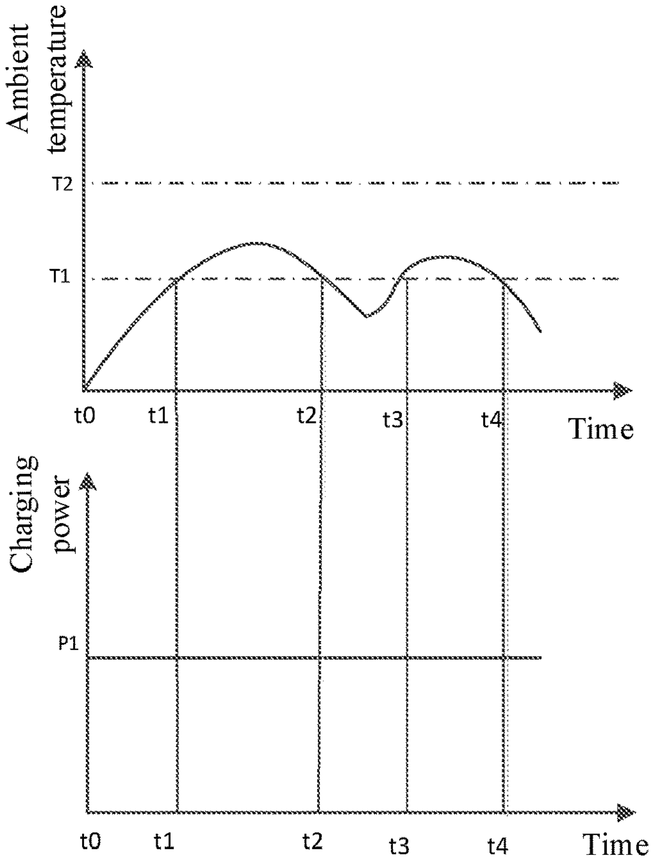

FIG. 7*b* illustrates a schematic diagram of control of charging power according to a working temperature in a charging process of an electric vehicle according to an embodiment of present disclosure. FIG. 7*b* depicts that the electric vehicle is charged from timing to, the working temperature in the power connector obtained by the temperature detection unit increases with time and exceeds the first temperature threshold T1 at timing t1 without exceeding a second temperature threshold T2. As the time elapses, the temperature detection unit continuously shortens the time interval for collecting the working temperature in the power connector according to the ascending trend of the working temperature, at which time the charging control unit keeps charging the electric vehicle with the first charging power P1. Next, the working temperature begins to represent a descending trend, and the time interval for collecting the working temperature in the power connector is continuously increased, and when timing t2 is reached, the working temperature decreases to the first temperature threshold T1, at which time the charging control unit keeps charging the electric vehicle with the first charging power P1. When the working temperature represents the ascending trend, the time interval for collecting the working temperature in the power connector is continuously shortened, and when timing t3 is reached, the working temperature increases to the first temperature threshold, at which time the charging control unit keeps charging the electric vehicle with the first charging power P1. Next, the working temperature begins to represent the descending trend, and the time interval for collecting the working temperature in the power connector is continuously increased, and when timing t4 is reached, the working temperature decreases to the first temperature threshold, at which time the charging control unit keeps charging the electric vehicle with the first charging power P1.

Figure 7C:
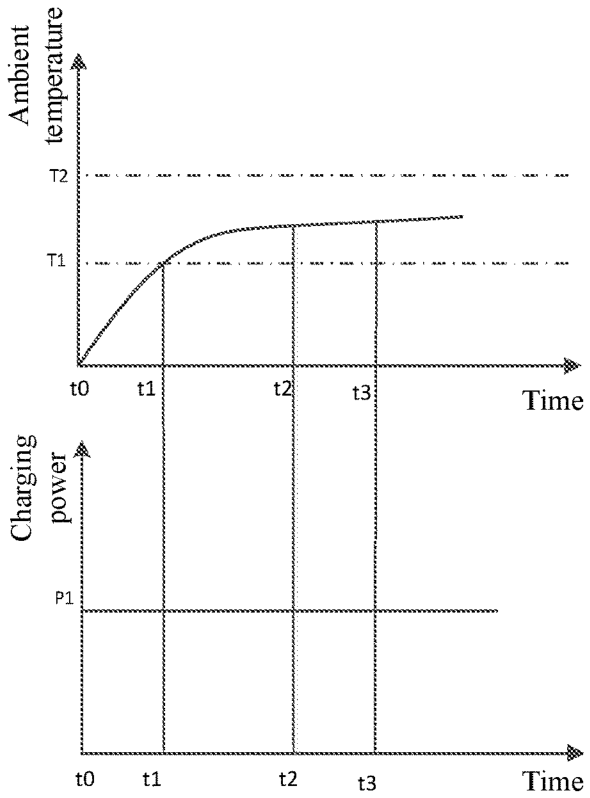

FIG. 7c illustrates a schematic diagram of control of charging power according to a working temperature in a charging process of an electric vehicle according to an embodiment of present disclosure. FIG. 7c depicts that the electric vehicle is charged from timing t0, the working temperature in the power connector obtained by the temperature detection unit increases with time and exceeds the first temperature threshold T1 at timing t1 without exceeding a second temperature threshold T2. As the time elapses, the temperature detection unit continuously shortens the time interval for collecting the working temperature in the power connector according to the ascending trend of the working temperature, at which time the charging control unit keeps charging the vehicle to be charged with the first charging power P1. Next, the working temperature represents a slow descending trend, and the time interval for collecting the working temperature in the power connector is continuously increased, and when timing t2 is reached, the working temperature is still between the first temperature threshold T1 and the second temperature threshold T2, at which time the charging control unit keeps charging the vehicle to be charged with the first charging power P1. Next, the working temperature represents a slow ascending trend, and the time interval for collecting the working temperature in the power connector is continuously shortened, and when timing t3 is reached, the working temperature is still between the first temperature threshold T1 and the second temperature threshold T2, at which time the charging control unit keeps charging the vehicle to be charged with the first charging power P1.

Figure 7D:
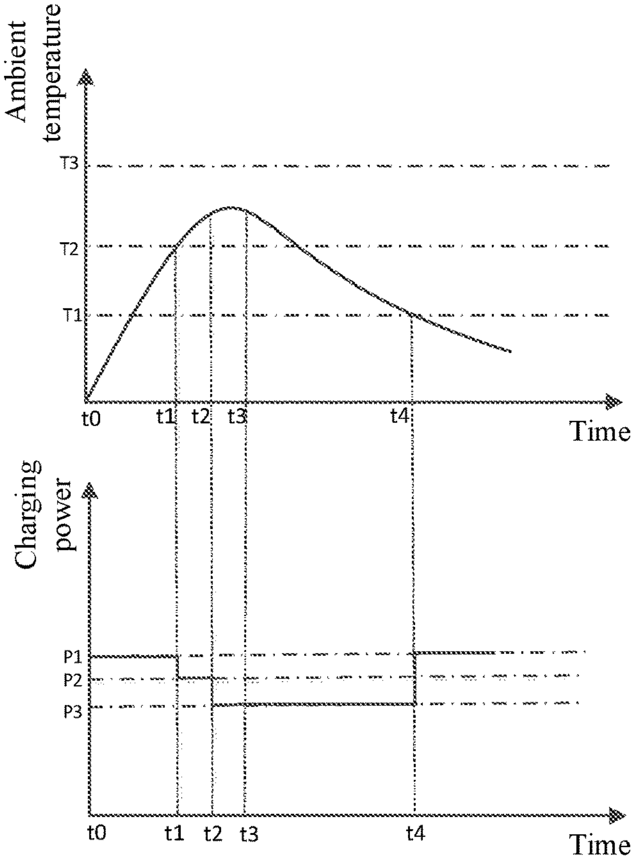

FIG. 7d illustrates a schematic diagram of control of charging power according to a working temperature in a charging process of an electric vehicle according to an embodiment of present disclosure. FIG. 7d depicts that the electric vehicle is charged from timing to, the working temperature in the power connector obtained by the temperature detection unit increases with time and exceeds the first temperature threshold T1 and reaches the second temperature threshold T2 at timing t1, at which time the charging control unit reduces the charging power output to the electric vehicle from the first charging power P1 to a second charging power P2. As the time elapses, the temperature detection unit continuously shortens the time interval for collecting the working temperature in the power connector according to the ascending trend of the working temperature, and when the working temperature is still in the ascending trend after exceeding the second temperature threshold T2 at the timing t2, the charging control unit further reduces the charging power output to the electric vehicle from the second charging power P2 to a third charging power P3. Next, the working temperature begins to represent a descending trend, and the time interval for collecting the working temperature in the power connector is continuously increased, and when timing t3 is reached, the working temperature is still higher than the second temperature threshold T2, at which time the charging control unit keeps charging the electric vehicle with the third charging power P3. When the working temperature is still in the descending trend, the time interval for collecting the working temperature in the power connector is continuously increased, and when timing t4 is reached, the working temperature decreases below the first temperature threshold, at which time the charging control unit increases the charging power from the third charging power to the first charging power to charge the electric vehicle.

Figure 7E:
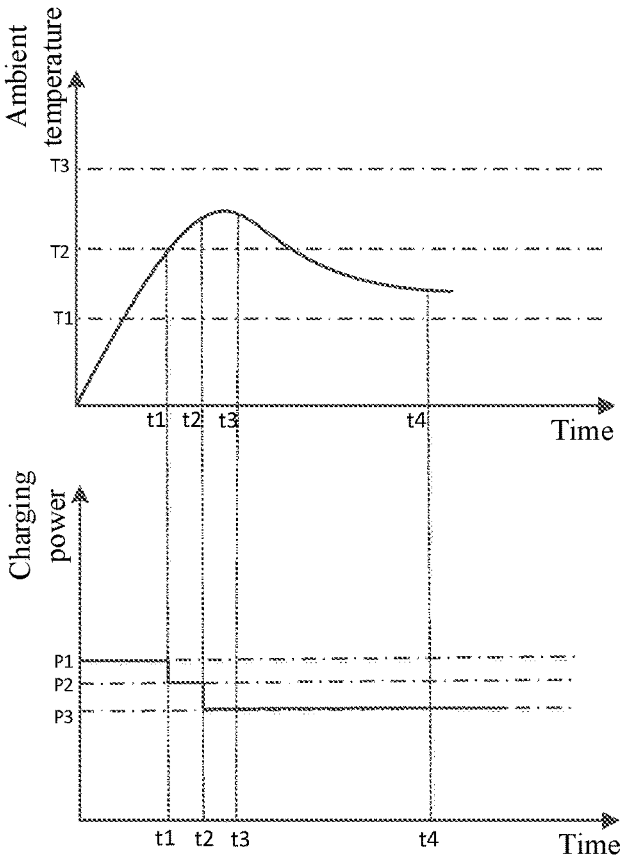

FIG. 7e illustrates a schematic diagram of control of charging power according to a working temperature in a charging process of an electric vehicle according to an embodiment of present disclosure. FIG. 7e depicts that the electric vehicle is charged from timing t0, the working temperature in the power connector obtained by the temperature detection unit increases with time and exceeds the first temperature threshold T1 and reaches the second temperature threshold T2 at timing t1, at which time the charging control unit reduces the charging power output to the electric vehicle from the first charging power P1 to a second charging power P2. As the time elapses, the temperature detection unit continuously shortens the time interval for collecting the working temperature in the power connector according to the ascending trend of the working temperature, and when the working temperature is still in the ascending trend after exceeding the second temperature threshold T2 at the timing t2, the charging control unit further reduces the charging power output to the electric vehicle from the second charging power P2 to a third charging power P3. Next, the working temperature begins to represent a descending trend, and the time interval for collecting the working temperature in the power connector is continuously increased, and when timing t3 is reached, the working temperature is still higher than the second temperature threshold T2, at which time the charging control unit keeps charging the electric vehicle with the third charging power P3. When the working temperature is still in the descending trend, the time interval for collecting the working temperature in the power connector is continuously increased, and when timing t4 is reached, the working temperature is still between the first temperature threshold and the second temperature threshold, at which time the charging control unit keeps charging the electric vehicle with the third charging power P3.

Figure 7F:
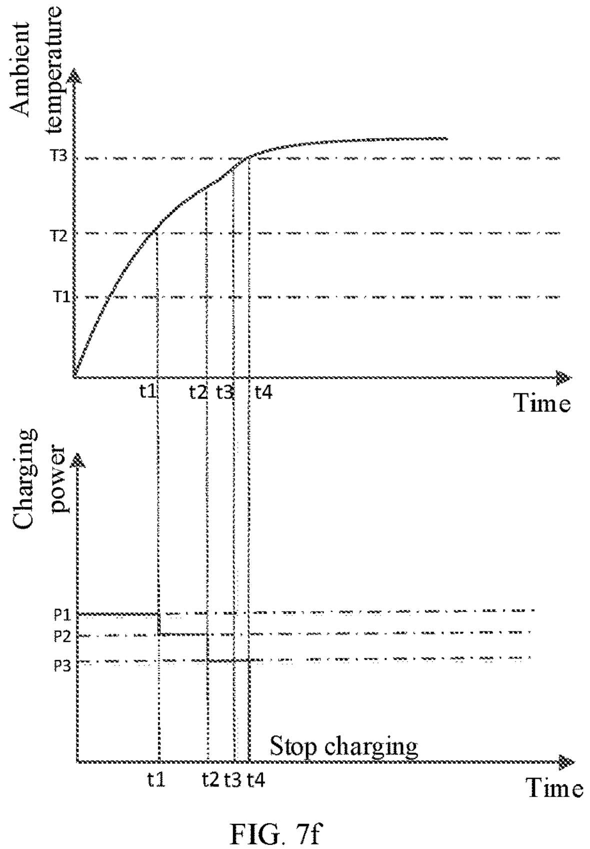

FIG. 7f illustrates a schematic diagram of control of charging power according to a working temperature in a charging process of an electric vehicle according to an embodiment of present disclosure. FIG. 7f depicts that the electric vehicle is charged from timing to, the working temperature in the power connector obtained by the temperature detection unit increases with time and exceeds the first temperature threshold T1 and reaches the second temperature threshold T2 at timing t1, at which time the charging control unit reduces the charging power output to the electric vehicle from the first charging power P1 to a second charging power P2. As the time elapses, the temperature detection unit continuously shortens the time interval for collecting the working temperature in the power connector according to the ascending trend of the working temperature, and when the working temperature is still in the ascending trend after exceeding the second temperature threshold T2 at the timing t2, the charging control unit further reduces the charging power output to the electric vehicle from the second charging power P2 to a third charging power P3. Next, the working temperature is still in the ascending trend, and the time interval for collecting the working temperature in the power connector is continuously shortened, and when timing t3 is reached, the working temperature is still higher than the second temperature threshold T2 but lower than the third temperature threshold T3, at which time the charging control unit keeps charging the vehicle to be charged with the third charging power P3. When the working temperature is still in the ascending trend, the time interval for collecting the working temperature in the power connector is continuously shortened, and when timing t4 is reached, the working temperature reaches the third temperature threshold, at which time the charging control unit stops charging the electric vehicle.

Figure 7G:
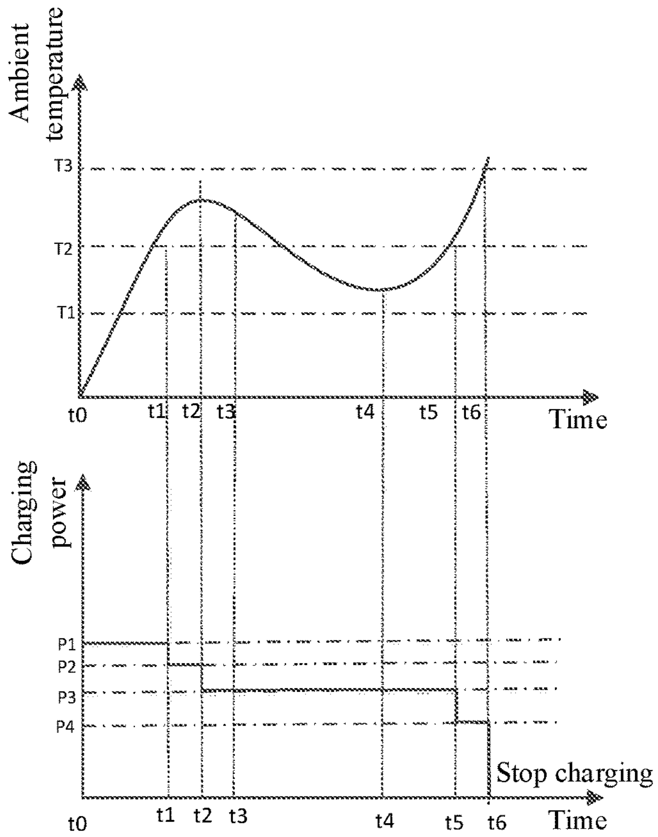

FIG. 7g illustrates a schematic diagram of control of charging power according to a working temperature in a charging process of an electric vehicle according to an embodiment of present disclosure. FIG. 7g depicts that the electric vehicle is charged from timing t0, the working temperature in the power connector obtained by the temperature detection unit increases with time and exceeds the first temperature threshold T1 and reaches the second temperature threshold T2 at timing t1, at which time the charging control unit reduces the charging power output to the electric vehicle from the first charging power P1 to a second charging power P2. As the time elapses, the temperature detection unit continuously shortens the time interval for collecting the working temperature in the power connector according to the ascending trend of the working temperature, and when the working temperature is still in the ascending trend after exceeding the second temperature threshold T2 at the timing t2, the charging control unit further reduces the charging power output to the electric vehicle from the second charging power P2 to a third charging power P3. Next, the working temperature begins to represent a descending trend, and the time interval for collecting the working temperature in the power connector is continuously increased, and when timing t3 is reached, the working temperature is still higher than the second temperature threshold T2, at which time the charging control unit keeps charging the electric vehicle with the third charging power P3. When the working temperature is still in the descending trend, the time interval for collecting the working temperature in the power connector is continuously increased, and when timing t4 is reached, the working temperature is still between the first temperature threshold and the second temperature threshold, at which time the charging control unit keeps charging the electric vehicle with the third charging power P3. As the time elapses, the temperature detection unit continuously shortens the time interval for collecting the working temperature in the power connector according to the ascending trend of the working temperature, and when timing t5 is reached, the working temperature is still in the ascending trend after reaching the second temperature threshold T2, at which time the charging control unit further reduces the charging power output to the electric vehicle from the third charging power P3 to a fourth charging power P4. As the working temperature continuously increases, the temperature detection unit continuously shortens the time interval for collecting the working temperature in the power connector according to the ascending trend of the working temperature, and when timing t6 is reached, the working temperature reaches the third temperature threshold T3, at which time the charging control unit stops charging the electric vehicle.

Figure 7H:
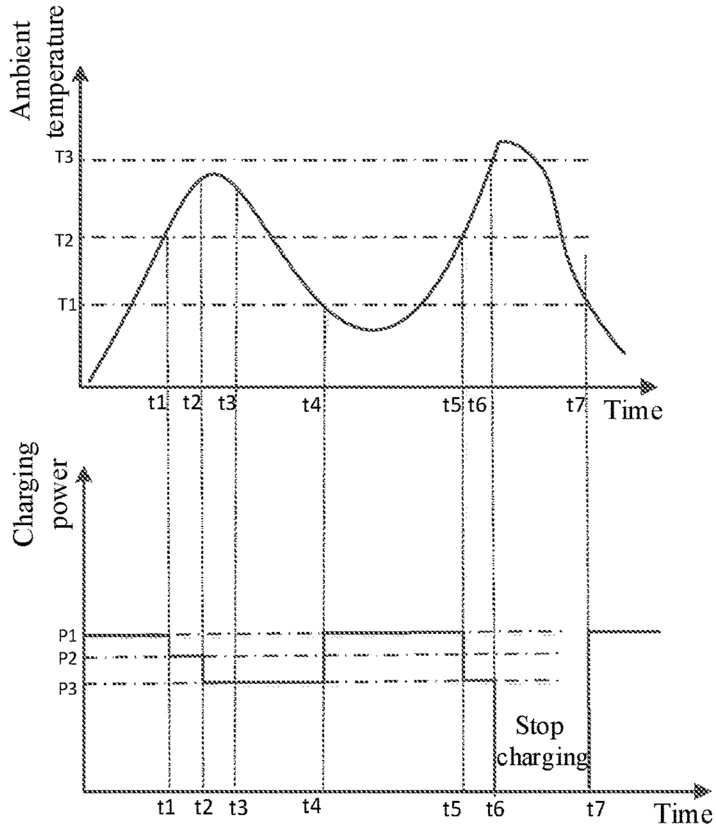

FIG. 7h illustrates a schematic diagram of control of charging power according to a working temperature in a charging process of an electric vehicle according to an embodiment of present disclosure. FIG. 7h depicts that the electric vehicle is charged from timing to, the working temperature in the power connector obtained by the temperature detection unit increases with time and exceeds the first temperature threshold T1 and reaches the second temperature threshold T2 at timing t1, at which time the charging control unit reduces the charging power output to the electric vehicle from the first charging power P1 to a second charging power P2. As the time elapses, the temperature detection unit continuously shortens the time interval for collecting the working temperature in the power connector according to the ascending trend of the working temperature, and when the working temperature is still in the ascending trend after exceeding the second temperature threshold T2 at the timing t2, the charging control unit further reduces the second charging power output to the electric vehicle from the second charging power P2 to a third charging power P3. Next, the working temperature begins to represent a descending trend, and the time interval for collecting the working temperature in the power connector is continuously increased, and when timing t3 is reached, the working temperature is still higher than the second temperature threshold T2, at which time the charging control unit keeps charging the electric vehicle with the third charging power P3. When the working temperature is still in the descending trend, the time interval for collecting the working temperature in the power connector is continuously increased, and when timing t4 is reached and the working temperature decreases below the first temperature threshold, the charging control unit improves the charging power from the third charging power to the first charging power to charge the electric vehicle. As the increase of the charging power, the working temperature in the power connector continuously increases, the time interval for collecting the working temperature in the power connector is continuously shortened, and when the working temperature exceeds the first temperature threshold T1 and reaches the second temperature threshold T2 again, the charging power output to the electric vehicle is reduced from the first charging power P1 to the third charging power P3 at timing t5. Even with this control, the working temperature in the power connector still continuously increases, and the time interval for collecting the working temperature in the power connector is continuously shortened. When the working temperature reaches the third temperature threshold at timing t6, the charging control unit stops charging the electric vehicle. Next, the working temperature in the power connector continuously decreases, and the time interval for collecting the working temperature in the power connector is continuously increased. When the working temperature is lower than the first temperature threshold T1 at timing t7, the charging control unit control to resume to charge the electric vehicle with the first charging power P1.

Figure 7I:
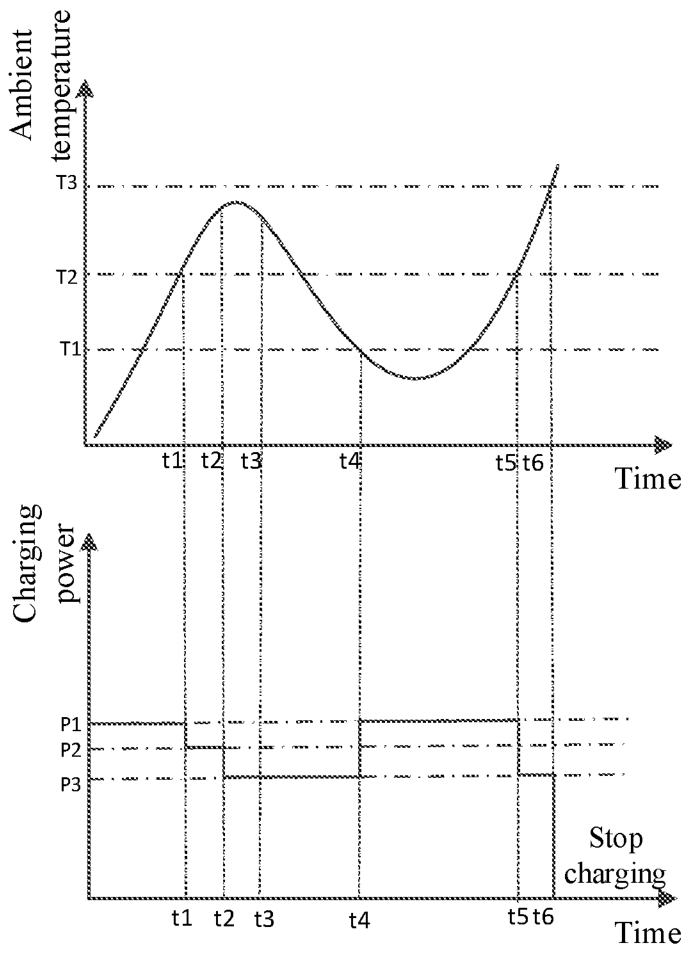

FIG. 7i illustrates a schematic diagram of control of charging power according to a working temperature in a charging process of an electric vehicle according to an embodiment of present disclosure. FIG. 7i depicts that the electric vehicle is charged from timing to, the working temperature in the power connector obtained by the temperature detection unit increases with time and exceeds the first temperature threshold T1 and reaches the second temperature threshold T2 at timing t1, at which time the charging control unit reduces the charging power output to the electric vehicle from the first charging power P1 to a second charging power P2. As the time elapses, the temperature detection unit continuously shortens the time interval for collecting the working temperature in the power connector according to the ascending trend of the working temperature, and when the working temperature is still in the ascending trend after exceeding the second temperature threshold T2 at the timing t2, the charging control unit further reduces the charging power output to the electric vehicle from the second charging power P2 to a third charging power P3. Next, the working temperature begins to represent a descending trend, and the time interval for collecting the working temperature in the power connector is continuously increased, and when timing t3 is reached, the working temperature is still higher than the second temperature threshold T2, at which time the charging control unit keeps charging the electric vehicle with the third charging power P3. When the working temperature is still in the descending trend, the time interval for collecting the working temperature in the power connector is continuously increased, and when timing t4 is reached and the working temperature decreases to the first temperature threshold, the charging control unit increases the charging power from the third charging power P3 to the first charging power P1 to charge the electric vehicle. As the time elapses, the temperature detection unit continuously shortens the time interval for collecting the working temperature in the power connector according to the ascending trend of the working temperature, and the charging control unit continues charging the electric vehicle with the first charging power P1. When the working temperature is still in the ascending trend after reaching the second temperature threshold T2 at timing t5, the time interval for collecting the working temperature in the power connector is continuously shortened, at which time the charging control unit reduces the charging power output to the electric vehicle from the first charging power P1 to the third charging power P3. As the working temperature continuously increases, temperature detection unit continuously shortens the time interval for collecting the working temperature in the power connector according to the ascending trend of the working temperature, and after the working temperature reaches the third temperature threshold T3 at timing t6, the charging control unit controls to stop charging the electric vehicle.

An embodiment of the present disclosure further provides a computer device, including a memory, a processor, and a computer program stored in the memory and executable on the processor, wherein the processor is configured to execute the computer program to implement the following steps:

- periodically obtaining a working temperature;
- maintaining a charging power output to an electric vehicle at a first charging power and triggering a first prompt signal, when the working temperature is greater than or equal to a first temperature threshold and less than a second temperature threshold; and
- reducing the charging power output to the electric vehicle from the first charging power to a second charging power, when the working temperature is greater than or equal to the second temperature threshold and less than a third temperature threshold.

The computer device according to the embodiment of the present disclosure can also implement the method as illustrated in FIGS. 2 and 7*a* to 7*i*.

Corresponding to the method as illustrated in FIGS. 2 and 7*a* to 7*i*, an embodiment of the present disclosure further provides a computer nonvolatile readable storage medium storing a computer program, wherein when being executed by a processor, the computer program implements the steps of the above method.

An embodiment of the present disclosure further provides a computer readable instruction, wherein when the instruction is executed by a processor, a program therein causes the processor to implement the method as illustrated in FIGS. 2 and 7*a* to 7*i*.

It should be understood that in various embodiments of the present disclosure, the sequential number of each process does not indicate the order of execution that should be determined according to the function and the internal logic, and also does not restrict the implementation process of the embodiments herein.

It should be further understood that in the embodiments of the present disclosure, the term 'and/or' is merely an association relationship describing the associated objects, and indicates that there may be three relationships. For example, A and/or B may indicate that A exists alone, A and B exist simultaneously, and B exists alone. In addition, the character '/' herein generally indicates that the associated objects are in an 'or' relationship.

Those skilled in the art can appreciate that the units and algorithm steps of the examples described in conjunction with the embodiments disclosed herein can be implemented by electronic hardware, computer software or a combination thereof, and in order to clearly illustrate the interchangeability between hardware and software, the compositions and steps of the examples have been generally described as above in terms of functions. Whether these functions are performed in hardware or software depends on the particular application and design constraints of the technical solution. Professionals can implement the described functions using different methods for each particular application, but such implementation should not be considered as going beyond the scope of the present disclosure.

It can be clearly understood by those skilled in the art that for the convenience and conciseness of the description, the specific working processes of the systems, apparatuses and units described above can refer to the corresponding processes in the foregoing method embodiments, and will not be repeated here.

In several embodiments provided herein, it should be understood that the disclosed systems, apparatuses and methods can be implemented in other ways. For example, the apparatus embodiments described above are merely illustrative, e.g., the unit partitioning is only a logical function partitioning, and other partitioning modes are possible during the actual implementation. For example, a plurality of units or components may be combined or integrated into another system, or some features may be omitted or not executed. In addition, the mutual coupling or direct coupling or communication connection illustrated or discussed may be an indirect coupling or communication connection through some interfaces, means or units, and may be in electrical, mechanical or other forms.

The units described as separate components may or may not be physically separated, and the components displayed as units may or may not be physical units, i.e., they may be located in one place or distributed to a plurality of network units. Some or all of the units can be selected according to the actual needs to achieve the objectives of the embodiments of the present disclosure.

In addition, the functional units in the embodiments of the present disclosure may be integrated into one processing unit, or each unit may be existed physically alone, or two or more units may be integrated into one unit. The integrated unit may be implemented in the form of hardware or a software functional unit.

If being implemented in the form of a software functional unit and sold or used as an independent product, the integrated unit may be stored in a computer readable storage medium. Based on such understanding, the essence of the technical solutions of the present disclosure, i.e., portions making contributions to the prior art, or all or part of the technical solutions may be embodied in the form of a computer software product, which is stored in a storage medium and includes several instructions for causing a computer device (e.g., a personal computer, a server, a network device, etc.) to perform all or part of the steps of the methods described in the embodiments of the present disclosure. The foregoing storage medium includes various media that can store program codes, such as a USB flash disk, a mobile hard disk, a Read-Only Memory (ROM), a Random-Access Memory (RAM), a magnetic disk, or an optical disk.

Specific embodiments are used herein to explain the principles and the implementations of the present disclosure, and the descriptions of the above embodiments are only intended to help understanding of the method and the core idea of the present disclosure. Meanwhile, those of ordinary skilled in the art can modify the implementations and the application scope according to the concept of the present disclosure. To sum up, the content of this specification should not be construed as limitations to the present disclosure.

The invention claimed is:

1. An electric vehicle charging control method, comprising:

periodically obtaining a working temperature;

maintaining a charging power output to an electric vehicle at a first charging power and triggering a first prompt signal, when the working temperature is greater than or equal to a first temperature threshold and less than a second temperature threshold;

reducing the charging power output to the electric vehicle from the first charging power to a second charging power, when the working temperature is greater than or equal to the second temperature threshold and less than a third temperature threshold; and after reducing the charging power output to the electric vehicle from the first charging power to the second charging power, when the working temperature is greater than or equal to the second temperature threshold and less than the third temperature threshold, the method further comprises increasing the power output to the electric vehicle to a power greater than or equal to the second charging power when the working temperature is in a descending trend.

2. The method according to claim 1, further comprising:

stopping charging the electric vehicle when the working temperature is greater than or equal to the third temperature threshold.

3. The method according to claim 2, wherein after stopping charging the electric vehicle when the working temperature is greater than or equal to the third temperature threshold, the method further comprises one of:

restoring the charging power output to the electric vehicle, when the working temperature decreases to the second temperature threshold, wherein the charging power is greater than zero;

or restoring the charging power output to the electric vehicle to be greater than zero, when the working temperature decreases below the third temperature threshold.

4. The method according to claim 2, further comprising:

determining whether a working state of a temperature detection unit is a normal working state according to the working temperature, and recording the working state of the temperature detection unit; and after stopping charging the electric vehicle when the working temperature is greater than or equal to the third temperature threshold, the method further comprises:

stopping charging the electric vehicle until the electric vehicle is powered on again, and querying the working state of the temperature detection unit;

restoring the charging power output to the electric vehicle as the first charging power if the working state of the temperature detection unit is the normal working state; and continuing stopping charging the electric vehicle if the working state of the temperature detection unit is an abnormal working state.

5. The method according to claim 1, wherein periodically obtaining the working temperature further comprises:

obtaining the working temperature of a power connector according to a specified time.

6. The method according to claim 1, wherein periodically obtaining the working temperature further comprises:

setting a time interval for obtaining the working temperature according to a change trend of the working temperature or to a climate condition.

7. The method according to claim 1, wherein maintaining the charging power output to the electric vehicle from the first charging power and triggering the first prompt signal, when the working temperature is greater than or equal to the first temperature threshold and less than the second temperature threshold further comprises:

prompting a user of a current state of the working temperature through the first prompt signal by means of at least one selected from a group of sound, light, and vibration.

8. The method according to claim 1, wherein after reducing the charging power output to the electric vehicle from the first charging power to the second charging power, when the working temperature is greater than or equal to the second temperature threshold and less than the third temperature threshold, the method further comprises:

further reducing the charging power output to the electric vehicle from the second charging power to a third charging power when the working temperature is in an ascending trend.

9. The method according to claim 8, wherein the power is a first power, and after further reducing the charging power output to the electric vehicle from the second charging power to the third charging power when the working temperature is in the ascending trend, the method further comprises one of:

when the third charging power is output to the electric vehicle, in a case where the working temperature decreases to a range between the first temperature threshold and the second temperature threshold, and then the working temperature is in the ascending trend and is greater than or equal to the second temperature threshold and less than the third temperature threshold again, further reducing the charging power output to the electric vehicle from the third charging power to a second power lower than the third charging power;

or when the third charging power is output to the electric vehicle, in the case where the working temperature decreases to the range between the first temperature threshold and the second temperature threshold and then the working temperature is in the ascending trend again, stopping charging the electric vehicle;

or increasing the charging power output to the electric vehicle from the third charging power to a third power greater than or equal to the third charging power, when the third charging power is output to the electric vehicle and the working temperature decreases below the first temperature threshold.

10. The method according to claim 8, wherein the power is a first power, and after further reducing the charging power output to the electric vehicle from the second charging power to the third charging power when the working temperature is in the ascending trend, the method further comprises:

increasing the charging power output to the electric vehicle from the third charging power to a second power greater than or equal to the third charging power, when the third charging power is output to the electric vehicle and the working temperature decreases below the first temperature threshold; and reducing the power output to the electric vehicle when the working temperature exceeds the second temperature threshold again.

11. The method according to claim 1, wherein after reducing the charging power output to the electric vehicle from the first charging power to the second charging power, when the working temperature is greater than or equal to the second temperature threshold and less than the third temperature threshold, the method further comprises:

stopping charging the electric vehicle when the working temperature is in an ascending trend.

12. The method according to claim 1, wherein maintaining the charging power output to the electric vehicle at the first charging power and triggering the first prompt signal, when the working temperature is greater than or equal to the first temperature threshold and less than the second temperature threshold, is replaced by:

reducing the charging power output to the electric vehicle from the first charging power when the working temperature is greater than or equal to the first temperature threshold and less than the second temperature threshold.

13. The method according to claim 12, wherein the power is a first power, and after reducing the charging power output to the electric vehicle from the first charging power when the working temperature is greater than or equal to the first temperature threshold and less than the second temperature threshold, the method further comprises:

increasing the power output to the electric vehicle to a second power less than or equal to the first charging power, when the working temperature decreases below the first temperature threshold.

14. An electric vehicle charging control apparatus comprising:

a temperature detection unit configured to periodically obtain a working temperature; and a charging control unit configured to:

maintain a charging power output to an electric vehicle at a first charging power and trigger a first prompt signal, when the working temperature is greater than or equal to a first temperature threshold and less than a second temperature threshold;

reduce the charging power output to the electric vehicle from the first charging power to a second charging power, when the working temperature is greater than or equal to the second temperature threshold and less than a third temperature threshold; and increase the power output to the electric vehicle to a power greater than or equal to the second charging power when the working temperature is in a descending trend.

15. The apparatus according to claim 14, wherein the charging control unit is further configured to:

stop charging the electric vehicle when the working temperature is greater than or equal to the third temperature threshold.

16. The apparatus according to claim 14, wherein the apparatus further comprises a memory configured to store a time specified by a user, and the temperature detection unit is configured to obtain the working temperature of a power connector according to the time.

17. The apparatus according to claim 14, wherein:

the charging control unit is configured to set a time interval for obtaining the working temperature according to a change trend of the working temperature or to a climate condition; and the temperature detection unit is configured to collect the working temperature according to the time interval for obtaining the working temperature set by the charging control unit.

18. The apparatus according to claim 14, further comprising a prompting unit configured to prompt a user of a current state of the working temperature by means of at least one selected from a group of sound, light, and vibration.

19. The apparatus according to claim 14, further comprising a communication unit configured to transmit first prompt information prompting a user that a current charging element temperature is high to an intelligent terminal of the user.

* * * * *